US009671307B2

(12) United States Patent
Gaudet et al.

(10) Patent No.: US 9,671,307 B2
(45) Date of Patent: Jun. 6, 2017

(54) LEAK LOCATION DETECTION SYSTEM

(71) Applicant: ATOMIC ENERGY OF CANADA LIMITED, Chalk River (CA)

(72) Inventors: Michel Gaudet, Pembroke (CA); Malcolm Clough, Pembroke (CA); Kristopher Jones, Deep River (CA)

(*) Notice: Subject to any disclaimer, the term of this patent is extended or adjusted under 35 U.S.C. 154(b) by 229 days.

(21) Appl. No.: 14/388,581

(22) PCT Filed: Mar. 28, 2013

(86) PCT No.: PCT/CA2013/050261
§ 371 (c)(1),
(2) Date: Sep. 26, 2014

(87) PCT Pub. No.: WO2013/143002
PCT Pub. Date: Oct. 3, 2013

(65) Prior Publication Data
US 2015/0068288 A1 Mar. 12, 2015

Related U.S. Application Data

(60) Provisional application No. 61/618,208, filed on Mar. 30, 2012.

(51) Int. Cl.
*G01M 3/22* (2006.01)
*F17D 5/04* (2006.01)
(52) U.S. Cl.
CPC ............. *G01M 3/22* (2013.01); *F17D 5/04* (2013.01)

(58) Field of Classification Search
CPC . G01M 3/00; G01M 3/20; G01M 3/22; F17D 5/04
See application file for complete search history.

(56) References Cited

U.S. PATENT DOCUMENTS

| 2,703,978 | A | | 3/1955 | Baxter |
| 3,842,659 | A | | 10/1974 | Bacroix |
| 3,977,233 | A | * | 8/1976 | Issel ......................... F17D 5/02 73/40.5 R |
| 4,404,843 | A | | 9/1983 | Johnson et al. |
| 4,450,711 | A | * | 5/1984 | Claude ..................... F16L 9/18 340/605 |
| 5,063,772 | A | | 11/1991 | Wellington et al. |
| 5,081,864 | A | | 1/1992 | Zaim |
| 5,375,457 | A | | 12/1994 | Trapp |
| 6,032,699 | A | | 3/2000 | Cochran et al. |
| 6,898,962 | B2 | * | 5/2005 | Jax .......................... G01M 3/22 73/40 |

(Continued)

OTHER PUBLICATIONS

Supplementary European Search Report with Written Opinion corresponding to European Patent Application No. 13770113.2, dated Nov. 4, 2015.

(Continued)

*Primary Examiner* — Nguyen Ha
(74) *Attorney, Agent, or Firm* — Lathrop & Gage LLP

(57) ABSTRACT

The present application pertains to a method of detecting and locating leaks in pipes having a secondary containment vessel. More particularly, the present application pertains to a method of leak detection whereby a tracer gas is introduced into a secondary containment vessel and detected in the primary pipe to determine the location of a leak in the primary pipe.

14 Claims, 17 Drawing Sheets

(56) References Cited

U.S. PATENT DOCUMENTS

| | | |
|---|---|---|
| 7,216,530 B2 | 5/2007 | Thomas |
| 7,461,541 B2 | 12/2008 | Adams et al. |
| 7,780,248 B2 | 8/2010 | Granadino |
| 7,788,967 B2 | 9/2010 | Golding et al. |
| 8,104,327 B1 | 1/2012 | Adams et al. |
| 2004/0149017 A1 | 8/2004 | Hutchinson et al. |
| 2010/0126250 A1 | 5/2010 | Jax |

OTHER PUBLICATIONS

Written Opinion corresponding to International Patent Application No. PCT/CA2013/050261, mailed Jul. 5, 2013.
International Search Report corresponding to International Patent Application No. PCT/CA2013/050261, mailed Jul. 5, 2013.

\* cited by examiner

Fig. 7

He Detection Times for Single Hole at Various Air Flow Rates Through Primary Tube - 100 feet

| Time (s) | 2LPM #1 | 2LPM #2 | 2LPM #3 | 3LPM #1 | 3LPM #2 | 3LPM #3 | 3LPM #4 | 3LPM #5 | 5LPM #1 | 5LPM #2 | 5LPM #3 | 10LPM #1 | 10LPM #2 | 10LPM #3 |
|---|---|---|---|---|---|---|---|---|---|---|---|---|---|---|
| 0.000 | 5.07E-06 | 4.96E-06 | 2.96E-06 | 1.72E-05 | 1.61E-05 | 1.67E-05 | 1.69E-05 | 6.32E-06 | 2.33E-06 | 2.31E-06 | 2.88E-06 | 2.06E-06 | 2.19E-06 | 2.22E-06 |
| 1.049 | 5.08E-06 | 4.97E-06 | 2.96E-06 | 1.72E-05 | 1.62E-05 | 1.67E-05 | 1.69E-05 | 6.30E-06 | 2.32E-06 | 2.30E-06 | 2.90E-06 | 2.07E-06 | 2.18E-06 | 2.22E-06 |
| 2.098 | 5.08E-06 | 4.97E-06 | 2.95E-06 | 1.72E-05 | 1.62E-05 | 1.67E-05 | 1.70E-05 | 6.30E-06 | 2.33E-06 | 2.31E-06 | 2.92E-06 | 2.07E-06 | 2.19E-06 | 2.23E-06 |
| 3.147 | 5.08E-06 | 4.96E-06 | 2.95E-06 | 1.72E-05 | 1.62E-05 | 1.67E-05 | 1.70E-05 | 6.28E-06 | 2.34E-06 | 2.31E-06 | 2.95E-06 | 2.08E-06 | 2.19E-06 | 2.22E-06 |
| | | | | | | Data deliberately hidden to shorten data listing | | | | | | | | |
| 50.350 | 5.05E-06 | 5.27E-06 | 2.93E-06 | 1.74E-05 | 1.64E-05 | 1.68E-05 | 1.72E-05 | 5.80E-06 | 2.37E-06 | 2.31E-06 | 2.93E-06 | 2.12E-06 | 2.21E-06 | 2.26E-06 |
| 51.399 | 5.05E-06 | 5.29E-06 | 2.93E-06 | 1.74E-05 | 1.64E-05 | 1.68E-05 | 1.72E-05 | 5.81E-06 | 2.37E-06 | 2.32E-06 | 2.93E-06 | 2.12E-06 | 2.21E-06 | 2.26E-06 |
| 52.448 | 5.05E-06 | 5.33E-06 | 2.93E-06 | 1.74E-05 | 1.64E-05 | 1.68E-05 | 1.72E-05 | 5.80E-06 | 2.37E-06 | 2.31E-06 | 2.92E-06 | 2.12E-06 | 2.21E-06 | 2.27E-06 |
| 53.497 | 5.04E-06 | 5.35E-06 | 2.93E-06 | 1.74E-05 | 1.64E-05 | 1.68E-05 | 1.72E-05 | 5.80E-06 | 2.36E-06 | 2.30E-06 | 2.92E-06 | 2.13E-06 | 2.21E-06 | 2.26E-06 |
| 54.545 | 5.06E-06 | 5.36E-06 | 2.93E-06 | 1.74E-05 | 1.64E-05 | 1.68E-05 | 1.72E-05 | 5.79E-06 | 2.36E-06 | 2.31E-06 | 2.92E-06 | 2.13E-06 | 2.21E-06 | 2.26E-06 |
| 55.594 | 5.06E-06 | 5.39E-06 | 2.94E-06 | 1.74E-05 | 1.64E-05 | 1.68E-05 | 1.72E-05 | 5.79E-06 | 2.36E-06 | 2.32E-06 | 2.93E-06 | 2.13E-06 | 2.22E-06 | 2.27E-06 |
| 56.643 | 5.05E-06 | 5.41E-06 | 2.94E-06 | 1.74E-05 | 1.64E-05 | 1.68E-05 | 1.72E-05 | 5.78E-06 | 2.36E-06 | 2.32E-06 | 2.92E-06 | 2.15E-06 | 2.22E-06 | 2.28E-06 |
| 57.692 | 5.06E-06 | 5.46E-06 | 2.94E-06 | 1.74E-05 | 1.64E-05 | 1.68E-05 | 1.72E-05 | 5.77E-06 | 2.37E-06 | 2.31E-06 | 2.92E-06 | 2.16E-06 | 2.23E-06 | 2.28E-06 |
| 58.741 | 5.05E-06 | 5.49E-06 | 2.94E-06 | 1.74E-05 | 1.64E-05 | 1.68E-05 | 1.72E-05 | 5.77E-06 | 2.36E-06 | 2.32E-06 | 2.91E-06 | 2.18E-06 | 2.25E-06 | 2.31E-06 |
| 59.790 | 5.05E-06 | 5.52E-06 | 2.95E-06 | 1.74E-05 | 1.64E-05 | 1.68E-05 | 1.72E-05 | 5.76E-06 | 2.36E-06 | 2.31E-06 | 2.93E-06 | 2.23E-06 | 2.31E-06 | 2.37E-06 |
| | | | | | | Data deliberately hidden to shorten data listing | | | | | | | | |
| 105.944 | 5.12E-06 | 5.84E-06 | 2.93E-06 | 1.74E-05 | 1.65E-05 | 1.68E-05 | 1.73E-05 | 5.54E-06 | 2.37E-06 | 2.33E-06 | 3.13E-06 | 9.76E-06 | 1.01E-05 | 1.03E-05 |
| 106.993 | 5.11E-06 | 5.83E-06 | 2.94E-06 | 1.74E-05 | 1.65E-05 | 1.69E-05 | 1.73E-05 | 5.53E-06 | 2.37E-06 | 2.33E-06 | 3.13E-06 | 9.77E-06 | 1.01E-05 | 1.03E-05 |
| 108.042 | 5.12E-06 | 5.81E-06 | 2.94E-06 | 1.74E-05 | 1.65E-05 | 1.68E-05 | 1.72E-05 | 5.53E-06 | 2.38E-06 | 2.33E-06 | 3.13E-06 | 9.77E-06 | 1.01E-05 | 1.03E-05 |
| 109.091 | 5.11E-06 | 5.81E-06 | 2.94E-06 | 1.74E-05 | 1.65E-05 | 1.69E-05 | 1.72E-05 | 5.52E-06 | 2.38E-06 | 2.34E-06 | 3.14E-06 | 9.78E-06 | 1.01E-05 | 1.03E-05 |
| 110.140 | 5.10E-06 | 5.78E-06 | 2.94E-06 | 1.74E-05 | 1.65E-05 | 1.69E-05 | 1.73E-05 | 5.53E-06 | 2.42E-06 | 2.37E-06 | 3.14E-06 | 9.78E-06 | 1.01E-05 | 1.03E-05 |
| 111.189 | 5.09E-06 | 5.76E-06 | 2.93E-06 | 1.74E-05 | 1.65E-05 | 1.69E-05 | 1.73E-05 | 5.52E-06 | 2.49E-06 | 2.40E-06 | 3.17E-06 | 9.78E-06 | 1.01E-05 | 1.03E-05 |
| 112.238 | 5.10E-06 | 5.74E-06 | 2.94E-06 | 1.74E-05 | 1.65E-05 | 1.69E-05 | 1.72E-05 | 5.50E-06 | 2.60E-06 | 2.48E-06 | 3.23E-06 | 9.80E-06 | 1.01E-05 | 1.03E-05 |
| 113.287 | 5.09E-06 | 5.73E-06 | 2.93E-06 | 1.74E-05 | 1.65E-05 | 1.69E-05 | 1.72E-05 | 5.50E-06 | 2.79E-06 | 2.61E-06 | 3.34E-06 | 9.81E-06 | 1.01E-05 | 1.03E-05 |
| 114.336 | 5.07E-06 | 5.72E-06 | 2.93E-06 | 1.74E-05 | 1.65E-05 | 1.68E-05 | 1.72E-05 | 5.50E-06 | 3.07E-06 | 2.82E-06 | 3.53E-06 | 9.80E-06 | 1.01E-05 | 1.03E-05 |

Time at which He detection starts to rise

Fig. 7, ctd.

| Time s | 2 lpm | 2 lpm | 2 lpm | 3 lpm | 3 lpm | 3 lpm | 3 lpm | 3 lpm | 5 lpm | 5 lpm | 5 lpm | 10 lpm | 10 lpm | 10 lpm |
|---|---|---|---|---|---|---|---|---|---|---|---|---|---|---|
| | | | | | | | | | | | | | | |
|  |  |  |  |  | He Detection Times for Single Hole at Various Air Flow Rates Through Primary Tube - 100 feet |  |  |  |  |  |  |  |  |  |
| 158.392 | 5.02E-06 | 5.38E-06 | 2.98E-06 | 1.75E-05 | 1.65E-05 | 1.69E-05 | 1.72E-05 | 5.26E-06 | 2.07E-05 | 2.03E-05 | 2.22E-05 | 9.86E-06 | 1.02E-05 | 1.03E-05 |
| 159.441 | 5.03E-06 | 5.37E-06 | 2.99E-06 | 1.75E-05 | 1.65E-05 | 1.69E-05 | 1.72E-05 | 5.26E-06 | 2.07E-05 | 2.03E-05 | 2.22E-05 | 9.86E-06 | 1.02E-05 | 1.04E-05 |
| 160.490 | 5.03E-06 | 5.37E-06 | 2.98E-06 | 1.75E-05 | 1.65E-05 | 1.69E-05 | 1.72E-05 | 5.25E-06 | 2.07E-05 | 2.03E-05 | 2.21E-05 | 9.86E-06 | 1.02E-05 | 1.04E-05 |
| 161.538 | 5.02E-06 | 5.36E-06 | 2.98E-06 | 1.75E-05 | 1.65E-05 | 1.69E-05 | 1.72E-05 | 5.24E-06 | 2.07E-05 | 2.04E-05 | 2.21E-05 | 9.86E-06 | 1.02E-05 | 1.04E-05 |
| 162.587 | 5.02E-06 | 5.37E-06 | 2.99E-06 | 1.76E-05 | 1.65E-05 | 1.69E-05 | 1.72E-05 | 5.24E-06 | 2.08E-05 | 2.04E-05 | 2.21E-05 | 9.86E-06 | 1.02E-05 | 1.04E-05 |
| 163.636 | 5.03E-06 | 5.36E-06 | 2.99E-06 | 1.77E-05 | 1.65E-05 | 1.69E-05 | 1.72E-05 | 5.25E-06 | 2.08E-05 | 2.04E-05 | 2.21E-05 | 9.87E-06 | 1.02E-05 | 1.04E-05 |
| 164.685 | 5.03E-06 | 5.36E-06 | 2.98E-06 | 1.80E-05 | 1.66E-05 | 1.70E-05 | 1.72E-05 | 5.27E-06 | 2.08E-05 | 2.04E-05 | 2.20E-05 | 9.86E-06 | 1.02E-05 | 1.04E-05 |
| 165.734 | 5.02E-06 | 5.37E-06 | 2.99E-06 | 1.84E-05 | 1.67E-05 | 1.71E-05 | 1.73E-05 | 5.31E-06 | 2.08E-05 | 2.04E-05 | 2.20E-05 | 9.87E-06 | 1.02E-05 | 1.04E-05 |
| 166.783 | 5.04E-06 | 5.35E-06 | 2.99E-06 | 1.92E-05 | 1.69E-05 | 1.73E-05 | 1.75E-05 | 5.40E-06 | 2.08E-05 | 2.04E-05 | 2.20E-05 | 9.87E-06 | 1.02E-05 | 1.04E-05 |
| 167.832 | 5.04E-06 | 5.35E-06 | 2.98E-06 | 2.04E-05 | 1.73E-05 | 1.77E-05 | 1.79E-05 | 5.55E-06 | 2.08E-05 | 2.05E-05 | 2.20E-05 | 9.87E-06 | 1.02E-05 | 1.04E-05 |
| 168.881 | 5.04E-06 | 5.34E-06 | 2.99E-06 | 2.22E-05 | 1.79E-05 | 1.83E-05 | 1.85E-05 | 5.78E-06 | 2.08E-05 | 2.05E-05 | 2.20E-05 | 9.86E-06 | 1.02E-05 | 1.04E-05 |
| 169.930 | 5.04E-06 | 5.32E-06 | 2.98E-06 | 2.46E-05 | 1.89E-05 | 1.93E-05 | 1.94E-05 | 6.16E-06 | 2.08E-05 | 2.05E-05 | 2.19E-05 | 9.87E-06 | 1.02E-05 | 1.04E-05 |
| 170.979 | 5.05E-06 | 5.33E-06 | 2.98E-06 | 2.78E-05 | 2.04E-05 | 2.08E-05 | 2.08E-05 | 6.68E-06 | 2.08E-05 | 2.05E-05 | 2.19E-05 | 9.88E-06 | 1.02E-05 | 1.04E-05 |
| 172.028 | 5.05E-06 | 5.32E-06 | 2.98E-06 | 3.18E-05 | 2.24E-05 | 2.29E-05 | 2.28E-05 | 7.39E-06 | 2.08E-05 | 2.05E-05 | 2.19E-05 | 9.87E-06 | 1.02E-05 | 1.04E-05 |
| 173.077 | 5.06E-06 | 5.32E-06 | 2.98E-06 | 3.67E-05 | 2.52E-05 | 2.58E-05 | 2.56E-05 | 8.29E-06 | 2.08E-05 | 2.05E-05 | 2.19E-05 | 9.88E-06 | 1.02E-05 | 1.04E-05 |
|  |  |  |  |  |  |  |  | Data deliberately hidden to shorten data listing |  |  |  |  |  |  |
| 215.035 | 5.02E-06 | 5.22E-06 | 3.13E-06 | 1.60E-04 | 1.50E-04 | 1.54E-04 | 1.57E-04 | 3.33E-05 | 2.09E-05 | 2.06E-05 | 2.25E-05 | 9.89E-06 | 1.01E-05 | 1.03E-05 |
| 216.084 | 5.03E-06 | 5.22E-06 | 3.14E-06 | 1.61E-04 | 1.51E-04 | 1.55E-04 | 1.57E-04 | 3.32E-05 | 2.09E-05 | 2.06E-05 | 2.25E-05 | 9.89E-06 | 1.01E-05 | 1.03E-05 |
| 217.133 | 5.02E-06 | 5.23E-06 | 3.13E-06 | 1.61E-04 | 1.51E-04 | 1.55E-04 | 1.57E-04 | 3.30E-05 | 2.09E-05 | 2.06E-05 | 2.24E-05 | 9.88E-06 | 1.01E-05 | 1.03E-05 |
| 218.182 | 5.02E-06 | 5.23E-06 | 3.13E-06 | 1.61E-04 | 1.51E-04 | 1.55E-04 | 1.57E-04 | 3.29E-05 | 2.09E-05 | 2.06E-05 | 2.24E-05 | 9.88E-06 | 1.01E-05 | 1.03E-05 |
| 219.231 | 5.02E-06 | 5.24E-06 | 3.13E-06 | 1.61E-04 | 1.51E-04 | 1.55E-04 | 1.57E-04 | 3.28E-05 | 2.09E-05 | 2.06E-05 | 2.24E-05 | 9.88E-06 | 1.01E-05 | 1.03E-05 |
| 220.280 | 5.03E-06 | 5.27E-06 | 3.14E-06 | 1.62E-04 | 1.51E-04 | 1.55E-04 | 1.58E-04 | 3.27E-05 | 2.09E-05 | 2.06E-05 | 2.23E-05 | 9.87E-06 | 1.01E-05 | 1.03E-05 |
| 221.329 | 5.06E-06 | 5.32E-06 | 3.14E-06 | 1.62E-04 | 1.52E-04 | 1.56E-04 | 1.58E-04 | 3.26E-05 | 2.09E-05 | 2.06E-05 | 2.23E-05 | 9.87E-06 | 1.01E-05 | 1.03E-05 |
| 222.378 | 5.10E-06 | 5.39E-06 | 3.13E-06 | 1.62E-04 | 1.52E-04 | 1.56E-04 | 1.58E-04 | 3.25E-05 | 2.09E-05 | 2.06E-05 | 2.23E-05 | 9.87E-06 | 1.01E-05 | 1.03E-05 |
| 223.427 | 5.18E-06 | 5.52E-06 | 3.14E-06 | 1.62E-04 | 1.52E-04 | 1.56E-04 | 1.58E-04 | 3.24E-05 | 2.09E-05 | 2.06E-05 | 2.23E-05 | 9.86E-06 | 1.01E-05 | 1.03E-05 |
| 224.476 | 5.31E-06 | 5.72E-06 | 3.14E-06 | 1.62E-04 | 1.52E-04 | 1.56E-04 | 1.58E-04 | 3.23E-05 | 2.09E-05 | 2.06E-05 | 2.23E-05 | 9.86E-06 | 1.01E-05 | 1.03E-05 |
| 225.524 | 5.52E-06 | 6.01E-06 | 3.14E-06 | 1.63E-04 | 1.52E-04 | 1.56E-04 | 1.58E-04 | 3.23E-05 | 2.09E-05 | 2.06E-05 | 2.24E-05 | 9.86E-06 | 1.01E-05 | 1.03E-05 |
| 226.573 | 5.82E-06 | 6.45E-06 | 3.17E-06 | 1.63E-04 | 1.52E-04 | 1.56E-04 | 1.58E-04 | 3.22E-05 | 2.09E-05 | 2.06E-05 | 2.24E-05 | 9.79E-06 | 1.00E-05 | 1.02E-05 |
| 227.622 | 6.25E-06 | 7.03E-06 | 3.20E-06 | 1.63E-04 | 1.53E-04 | 1.56E-04 | 1.58E-04 | 3.21E-05 | 2.09E-05 | 2.06E-05 | 2.24E-05 | 9.60E-06 | 9.85E-06 | 9.97E-06 |
| 363.986 | 4.36E-05 | 4.39E-05 | 1.85E-05 | 1.64E-05 | 1.66E-05 | 1.69E-05 | 1.93E-05 | 3.55E-06 | 2.28E-06 | 2.26E-06 | 3.08E-06 | | | |

Fig. 8

| | \multicolumn{10}{c|}{He Detection Times for Single Hole at Various Air Flow Rates Through Primary Tube - 100 feet - 45 feet} |
|---|---|---|---|---|---|---|---|---|---|---|
| Time (s) | 2 lpm | 2 lpm | 2 lpm | 5 lpm | 5 lpm | 6 lpm | 6 lpm | 10 lpm | 10 lpm | 10 lpm |
| 0 | 5.33E-06 | 5.35E-06 | 5.27E-06 | 2.75E-06 | 2.64E-06 | 2.68E-06 | 2.35E-06 | 2.24E-06 | 2.29E-06 | 2.57E-06 | 2.56E-06 | 2.60E-06 |
| 1.053 | 5.33E-06 | 5.35E-06 | 5.27E-06 | 2.74E-06 | 2.64E-06 | 2.69E-06 | 2.38E-06 | 2.23E-06 | 2.29E-06 | 2.57E-06 | 2.56E-06 | 2.59E-06 |
| 2.105 | 5.33E-06 | 5.36E-06 | 5.27E-06 | 2.74E-06 | 2.63E-06 | 2.70E-06 | 2.40E-06 | 2.23E-06 | 2.30E-06 | 2.58E-06 | 2.57E-06 | 2.60E-06 |
| | \multicolumn{10}{c|}{Data deliberately hidden to shorten data listing} |
| 27.37 | 5.36E-06 | 5.40E-06 | 5.32E-06 | 2.88E-06 | 2.67E-06 | 2.78E-06 | 2.38E-06 | 2.26E-06 | 2.32E-06 | 2.62E-06 | 2.60E-06 | 2.62E-06 |
| 28.42 | 5.35E-06 | 5.39E-06 | 5.32E-06 | 2.87E-06 | 2.66E-06 | 2.77E-06 | 2.38E-06 | 2.26E-06 | 2.33E-06 | 2.61E-06 | 2.60E-06 | 2.61E-06 |
| 29.47 | 5.35E-06 | 5.39E-06 | 5.32E-06 | 2.88E-06 | 2.67E-06 | 2.76E-06 | 2.37E-06 | 2.26E-06 | 2.32E-06 | 2.61E-06 | 2.60E-06 | 2.61E-06 |
| 30.53 | 5.35E-06 | 5.39E-06 | 5.32E-06 | 2.87E-06 | 2.67E-06 | 2.76E-06 | 2.36E-06 | 2.26E-06 | 2.33E-06 | 2.62E-06 | 2.62E-06 | 2.62E-06 |
| 31.58 | 5.36E-06 | 5.39E-06 | 5.32E-06 | 2.88E-06 | 2.67E-06 | 2.76E-06 | 2.37E-06 | 2.27E-06 | 2.33E-06 | 2.65E-06 | 2.64E-06 | 2.65E-06 |
| 32.63 | 5.35E-06 | 5.39E-06 | 5.33E-06 | 2.88E-06 | 2.67E-06 | 2.76E-06 | 2.36E-06 | 2.26E-06 | 2.33E-06 | 2.71E-06 | 2.69E-06 | 2.71E-06 |
| | \multicolumn{10}{c|}{Data deliberately hidden to shorten data listing} |
| 43.16 | 5.36E-06 | 5.38E-06 | 5.32E-06 | 2.79E-06 | 2.67E-06 | 2.74E-06 | 2.34E-06 | 2.26E-06 | 2.33E-06 | 6.39E-06 | 6.33E-06 | 6.23E-06 |
| 44.21 | 5.36E-06 | 5.37E-06 | 5.32E-06 | 2.79E-06 | 2.67E-06 | 2.76E-06 | 2.34E-06 | 2.26E-06 | 2.33E-06 | 6.86E-06 | 6.81E-06 | 6.68E-06 |
| 45.26 | 5.36E-06 | 5.38E-06 | 5.31E-06 | 2.77E-06 | 2.68E-06 | 2.75E-06 | 2.33E-06 | 2.26E-06 | 2.33E-06 | 7.30E-06 | 7.27E-06 | 7.12E-06 |
| 46.32 | 5.36E-06 | 5.38E-06 | 5.32E-06 | 2.78E-06 | 2.67E-06 | 2.75E-06 | 2.34E-06 | 2.27E-06 | 2.33E-06 | 7.73E-06 | 7.69E-06 | 7.54E-06 |
| 47.37 | 5.36E-06 | 5.38E-06 | 5.32E-06 | 2.78E-06 | 2.67E-06 | 2.75E-06 | 2.34E-06 | 2.30E-06 | 2.36E-06 | 8.12E-06 | 8.09E-06 | 7.92E-06 |

Fig. 8, ctd.

| Time (s) | 2 lpm | 2 lpm | 2 lpm | 5 lpm | 5 lpm | 6 lpm | 6 lpm | 6 lpm | 10 lpm | 10 lpm | 10 lpm |
|---|---|---|---|---|---|---|---|---|---|---|---|
| | | | | | | He Detection Times for Single Hole at Various Air Flow Rates Through Primary Tube - 100 feet - 45 feet | | | | | |
| 48.42 | 5.36E-06 | 5.38E-06 | 5.32E-06 | 2.78E-06 | 2.67E-06 | 2.74E-06 | 2.35E-06 | 2.39E-06 | 2.42E-06 | 8.49E-06 | 8.43E-06 | 8.27E-06 |
| 49.47 | 5.36E-06 | 5.38E-06 | 5.32E-06 | 2.77E-06 | 2.67E-06 | 2.75E-06 | 2.38E-06 | 2.54E-06 | 2.55E-06 | 8.81E-06 | 8.76E-06 | 8.59E-06 |
| 50.53 | 5.36E-06 | 5.37E-06 | 5.32E-06 | 2.77E-06 | 2.67E-06 | 2.74E-06 | 2.45E-06 | 2.79E-06 | 2.77E-06 | 9.10E-06 | 9.05E-06 | 8.90E-06 |
| 51.58 | 5.36E-06 | 5.36E-06 | 5.32E-06 | 2.77E-06 | 2.67E-06 | 2.75E-06 | 2.59E-06 | 3.17E-06 | 3.11E-06 | 9.38E-06 | 9.32E-06 | 9.16E-06 |
| 52.63 | 5.36E-06 | 5.37E-06 | 5.32E-06 | 2.77E-06 | 2.68E-06 | 2.75E-06 | 2.82E-06 | 3.67E-06 | 3.59E-06 | 9.61E-06 | 9.56E-06 | 9.39E-06 |
| 53.68 | 5.36E-06 | 5.36E-06 | 5.31E-06 | 2.78E-06 | 2.68E-06 | 2.75E-06 | 3.19E-06 | 4.30E-06 | 4.18E-06 | 9.83E-06 | 9.79E-06 | 9.60E-06 |
| 54.74 | 5.36E-06 | 5.36E-06 | 5.32E-06 | 2.78E-06 | 2.68E-06 | 2.75E-06 | 3.68E-06 | 5.03E-06 | 4.90E-06 | 1.00E-05 | 9.98E-06 | 9.79E-06 |
| 55.79 | 5.36E-06 | 5.36E-06 | 5.31E-06 | 2.79E-06 | 2.69E-06 | 2.76E-06 | 4.31E-06 | 5.84E-06 | 5.71E-06 | 1.02E-05 | 1.02E-05 | 9.96E-06 |
| 56.84 | 5.36E-06 | 5.36E-06 | 5.31E-06 | 2.82E-06 | 2.71E-06 | 2.81E-06 | 5.07E-06 | 6.72E-06 | 6.60E-06 | 1.04E-05 | 1.04E-05 | 1.01E-05 |
| 57.89 | 5.36E-06 | 5.36E-06 | 5.31E-06 | 2.89E-06 | 2.76E-06 | 2.91E-06 | 5.92E-06 | 7.62E-06 | 7.52E-06 | 1.05E-05 | 1.05E-05 | 1.03E-05 |
| 58.95 | 5.37E-06 | 5.35E-06 | 5.31E-06 | 3.03E-06 | 2.87E-06 | 3.09E-06 | 6.82E-06 | 8.52E-06 | 8.46E-06 | 1.06E-05 | 1.06E-05 | 1.04E-05 |
| 60 | 5.36E-06 | 5.35E-06 | 5.31E-06 | 3.28E-06 | 3.09E-06 | 3.40E-06 | 7.79E-06 | 9.41E-06 | 9.37E-06 | 1.07E-05 | 1.07E-05 | 1.05E-05 |
| 61.05 | 5.37E-06 | 5.35E-06 | 5.32E-06 | 3.65E-06 | 3.43E-06 | 3.84E-06 | 8.75E-06 | 1.02E-05 | 1.02E-05 | 1.08E-05 | 1.08E-05 | 1.06E-05 |
| 62.11 | 5.37E-06 | 5.34E-06 | 5.32E-06 | 4.19E-06 | 3.93E-06 | 4.44E-06 | 9.71E-06 | 1.11E-05 | 1.12E-05 | 1.09E-05 | 1.09E-05 | 1.07E-05 |
| | | | | | | Data deliberately hidden to shorten data listing | | | | | | |
| 103.2 | 5.36E-06 | 5.36E-06 | 5.30E-06 | 2.40E-05 | 2.38E-05 | 2.39E-05 | 2.01E-05 | 1.88E-05 | 1.94E-05 | 9.99E-06 | 1.16E-05 | 9.84E-06 |
| 104.2 | 5.36E-06 | 5.38E-06 | 5.30E-06 | 2.40E-05 | 2.38E-05 | 2.39E-05 | 2.01E-05 | 1.88E-05 | 1.95E-05 | 8.81E-06 | 1.16E-05 | 8.70E-06 |
| 105.3 | 5.36E-06 | 5.38E-06 | 5.30E-06 | 2.40E-05 | 2.39E-05 | 2.40E-05 | 2.01E-05 | 1.88E-05 | 1.95E-05 | 7.62E-06 | 1.16E-05 | 7.53E-06 |
| 106.3 | 5.38E-06 | 5.39E-06 | 5.31E-06 | 2.41E-05 | 2.39E-05 | 2.38E-05 | 2.02E-05 | 1.88E-05 | 1.95E-05 | 6.50E-06 | 1.16E-05 | 6.43E-06 |
| 107.4 | 5.43E-06 | 5.44E-06 | 5.36E-06 | 2.41E-05 | 2.39E-05 | 2.39E-05 | 2.02E-05 | 1.88E-05 | 1.95E-05 | 5.53E-06 | 1.16E-05 | 5.47E-06 |

Fig. 9

He Detection Times for Single Hole at Various Air Flow Rates Through Primary Tube - 15 feet

| Time (s) | 2LPM #1 | 2LPM #2 | 2LPM #3 | 5LPM#1 | 5LPM#2 | 5LPM#3 | 10LPM#1 | 10LPM#2 | 10LPM#3 |
|---|---|---|---|---|---|---|---|---|---|
| 0.000 | 4.52E-06 | 4.54E-06 | 4.54E-06 | 2.28E-06 | 2.28E-06 | 2.29E-06 | 2.29E-06 | 2.28E-06 | 2.28E-06 |
| 1.053 | 4.53E-06 | 4.55E-06 | 4.55E-06 | 2.28E-06 | 2.29E-06 | 2.28E-06 | 2.28E-06 | 2.29E-06 | 2.28E-06 |
| | | | | Data deliberately hidden to shorten data listing | | | | | |
| 14.737 | 4.55E-06 | 4.56E-06 | 4.57E-06 | 2.30E-06 | 2.30E-06 | 2.31E-06 | 2.30E-06 | 2.30E-06 | 2.30E-06 |
| 15.789 | 4.55E-06 | 4.56E-06 | 4.58E-06 | 2.31E-06 | 2.30E-06 | 2.32E-06 | 2.31E-06 | 2.30E-06 | 2.30E-06 |
| 16.842 | 4.54E-06 | 4.56E-06 | 4.57E-06 | 2.32E-06 | 2.30E-06 | 2.32E-06 | 2.32E-06 | 2.31E-06 | 2.30E-06 |
| 17.895 | 4.55E-06 | 4.55E-06 | 4.58E-06 | 2.30E-06 | 2.30E-06 | 2.32E-06 | 2.33E-06 | 2.32E-06 | 2.32E-06 |
| 18.947 | 4.55E-06 | 4.56E-06 | 4.57E-06 | 2.30E-06 | 2.29E-06 | 2.32E-06 | 2.37E-06 | 2.34E-06 | 2.35E-06 |
| 20.000 | 4.55E-06 | 4.56E-06 | 4.58E-06 | 2.30E-06 | 2.29E-06 | 2.31E-06 | 2.44E-06 | 2.41E-06 | 2.43E-06 |
| 21.053 | 4.55E-06 | 4.56E-06 | 4.57E-06 | 2.31E-06 | 2.30E-06 | 2.31E-06 | 2.57E-06 | 2.50E-06 | 2.56E-06 |
| 22.105 | 4.56E-06 | 4.55E-06 | 4.58E-06 | 2.31E-06 | 2.29E-06 | 2.32E-06 | 2.75E-06 | 2.67E-06 | 2.75E-06 |
| 23.158 | 4.56E-06 | 4.55E-06 | 4.58E-06 | 2.31E-06 | 2.30E-06 | 2.31E-06 | 3.01E-06 | 2.89E-06 | 3.01E-06 |
| 24.211 | 4.55E-06 | 4.55E-06 | 4.56E-06 | 2.30E-06 | 2.30E-06 | 2.33E-06 | 3.31E-06 | 3.18E-06 | 3.32E-06 |
| 25.263 | 4.55E-06 | 4.55E-06 | 4.57E-06 | 2.32E-06 | 2.31E-06 | 2.37E-06 | 3.66E-06 | 3.51E-06 | 3.67E-06 |
| 26.316 | 4.55E-06 | 4.55E-06 | 4.57E-06 | 2.35E-06 | 2.33E-06 | 2.45E-06 | 4.05E-06 | 3.89E-06 | 4.06E-06 |
| 27.368 | 4.56E-06 | 4.56E-06 | 4.57E-06 | 2.43E-06 | 2.40E-06 | 2.61E-06 | 4.45E-06 | 4.29E-06 | 4.47E-06 |
| 28.421 | 4.56E-06 | 4.56E-06 | 4.57E-06 | 2.58E-06 | 2.55E-06 | 2.89E-06 | 4.89E-06 | 4.73E-06 | 4.89E-06 |
| | | | | Data deliberately hidden to shorten data listing | | | | | |
| 40.000 | 4.56E-06 | 4.56E-06 | 4.58E-06 | 1.11E-05 | 1.10E-05 | 1.21E-05 | 8.42E-06 | 8.36E-06 | 8.40E-06 |
| 41.053 | 4.56E-06 | 4.56E-06 | 4.57E-06 | 1.20E-05 | 1.20E-05 | 1.29E-05 | 8.60E-06 | 8.56E-06 | 8.58E-06 |
| 42.105 | 4.57E-06 | 4.56E-06 | 4.59E-06 | 1.29E-05 | 1.28E-05 | 1.37E-05 | 8.77E-06 | 8.75E-06 | 8.75E-06 |
| 43.158 | 4.63E-06 | 4.59E-06 | 4.61E-06 | 1.37E-05 | 1.37E-05 | 1.44E-05 | 8.92E-06 | 8.90E-06 | 8.90E-06 |

Fig. 12

| Time (s) | He Detection Times for Three Hole at Various Air Flow Rates Through Primary Tube – 28/33/53 0.feet | | | | | | | | |
|---|---|---|---|---|---|---|---|---|---|
| | 3 LPM | 3 LPM | 3 LPM | 4 LPM | 4 LPM | 4 LPM | 5 LPM | 5 LPM | 5 LPM |
| 0.0 | 1.98E-05 | 1.95E-05 | 1.94E-05 | 1.59E-05 | 1.58E-05 | 1.56E-05 | 1.27E-05 | 1.24E-05 | 1.23E-05 |
| 1.0 | 1.98E-05 | 1.95E-05 | 1.94E-05 | 1.59E-05 | 1.58E-05 | 1.56E-05 | 1.27E-05 | 1.24E-05 | 1.23E-05 |
| 2.1 | 1.98E-05 | 1.95E-05 | 1.94E-05 | 1.59E-05 | 1.59E-05 | 1.56E-05 | 1.27E-05 | 1.24E-05 | 1.23E-05 |
| | Data deliberately hidden to shorten data listing | | | | | | | | |
| 33.5 | 2.00E-05 | 1.97E-05 | 1.96E-05 | 1.62E-05 | 1.61E-05 | 1.59E-05 | 1.34E-05 | 1.27E-05 | 1.26E-05 |
| 34.6 | 2.00E-05 | 1.97E-05 | 1.96E-05 | 1.62E-05 | 1.61E-05 | 1.59E-05 | 1.34E-05 | 1.27E-05 | 1.26E-05 |
| 35.6 | 2.00E-05 | 1.97E-05 | 1.96E-05 | 1.62E-05 | 1.61E-05 | 1.59E-05 | 1.34E-05 | 1.27E-05 | 1.26E-05 |
| 36.7 | 2.00E-05 | 1.97E-05 | 1.96E-05 | 1.62E-05 | 1.61E-05 | 1.59E-05 | 1.34E-05 | 1.27E-05 | 1.27E-05 |
| 37.7 | 2.00E-05 | 1.97E-05 | 1.96E-05 | 1.62E-05 | 1.62E-05 | 1.59E-05 | 1.35E-05 | 1.28E-05 | 1.28E-05 |
| 38.8 | 2.00E-05 | 1.97E-05 | 1.96E-05 | 1.62E-05 | 1.62E-05 | 1.59E-05 | 1.38E-05 | 1.30E-05 | 1.31E-05 |
| 39.8 | 2.00E-05 | 1.97E-05 | 1.96E-05 | 1.62E-05 | 1.61E-05 | 1.59E-05 | 1.42E-05 | 1.36E-05 | 1.37E-05 |
| 40.8 | 2.00E-05 | 1.97E-05 | 1.96E-05 | 1.62E-05 | 1.62E-05 | 1.59E-05 | 1.50E-05 | 1.45E-05 | 1.47E-05 |
| 41.9 | 2.00E-05 | 1.97E-05 | 1.96E-05 | 1.62E-05 | 1.62E-05 | 1.59E-05 | 1.62E-05 | 1.60E-05 | 1.63E-05 |
| 42.9 | 2.00E-05 | 1.97E-05 | 1.96E-05 | 1.63E-05 | 1.62E-05 | 1.60E-05 | 1.78E-05 | 1.82E-05 | 1.86E-05 |
| 44.0 | 2.00E-05 | 1.97E-05 | 1.96E-05 | 1.65E-05 | 1.64E-05 | 1.62E-05 | 1.97E-05 | 2.09E-05 | 2.14E-05 |
| 45.0 | 2.00E-05 | 1.97E-05 | 1.96E-05 | 1.70E-05 | 1.68E-05 | 1.66E-05 | 2.21E-05 | 2.42E-05 | 2.48E-05 |
| 46.1 | 2.00E-05 | 1.97E-05 | 1.96E-05 | 1.79E-05 | 1.75E-05 | 1.75E-05 | 2.50E-05 | 2.78E-05 | 2.85E-05 |
| 47.1 | 2.00E-05 | 1.97E-05 | 1.96E-05 | 1.94E-05 | 1.88E-05 | 1.89E-05 | 2.81E-05 | 3.19E-05 | 3.25E-05 |
| 48.2 | 2.00E-05 | 1.97E-05 | 1.96E-05 | 2.16E-05 | 2.07E-05 | 2.10E-05 | 3.16E-05 | 3.61E-05 | 3.68E-05 |
| 49.2 | 2.00E-05 | 1.97E-05 | 1.96E-05 | 2.45E-05 | 2.34E-05 | 2.39E-05 | 3.54E-05 | 4.06E-05 | 4.12E-05 |
| 50.3 | 2.00E-05 | 1.97E-05 | 1.96E-05 | 2.81E-05 | 2.68E-05 | 2.74E-05 | 3.95E-05 | 4.50E-05 | 4.57E-05 |
| 51.3 | 2.00E-05 | 1.97E-05 | 1.96E-05 | 3.23E-05 | 3.08E-05 | 3.15E-05 | 4.38E-05 | 4.96E-05 | 5.02E-05 |
| 52.4 | 2.00E-05 | 1.98E-05 | 1.96E-05 | 3.69E-05 | 3.53E-05 | 3.61E-05 | 4.82E-05 | 5.41E-05 | 5.48E-05 |
| 53.4 | 2.01E-05 | 1.98E-05 | 1.97E-05 | 4.19E-05 | 4.01E-05 | 4.10E-05 | 5.27E-05 | 5.86E-05 | 5.93E-05 |
| 54.5 | 2.02E-05 | 2.00E-05 | 1.99E-05 | 4.70E-05 | 4.51E-05 | 4.60E-05 | 5.72E-05 | 6.30E-05 | 6.37E-05 |

Fig. 13

He Detection Times for Three Hole at Various Air Flow Rates Through Primary Tube – 28/33/53 feet
Times Observed Corresponding to Third Hole Location

| Time (s) | 4 LPM | 4 LPM | 4 LPM | 5 LPM | 5 LPM | 5 LPM |
|---|---|---|---|---|---|---|
| 89.02743 | 1.39E-04 | 1.39E-04 | 1.37E-04 | 1.07E-04 | 1.10E-04 | 1.10E-04 |
| 90.07481 | 1.39E-04 | 1.39E-04 | 1.37E-04 | 1.07E-04 | 1.10E-04 | 1.10E-04 |
| 91.12219 | 1.40E-04 | 1.39E-04 | 1.38E-04 | 1.07E-04 | 1.10E-04 | 1.10E-04 |
| 92.16958 | 1.40E-04 | 1.40E-04 | 1.38E-04 | 1.08E-04 | 1.10E-04 | 1.10E-04 |
| 93.21696 | 1.40E-04 | 1.40E-04 | 1.38E-04 | 1.08E-04 | 1.10E-04 | 1.10E-04 |
| 94.26434 | 1.41E-04 | 1.40E-04 | 1.38E-04 | 1.09E-04 | 1.10E-04 | 1.10E-04 |
| 95.31172 | 1.41E-04 | 1.40E-04 | 1.39E-04 | 1.09E-04 | 1.11E-04 | 1.11E-04 |
| 96.3591 | 1.41E-04 | 1.41E-04 | 1.39E-04 | 1.10E-04 | 1.11E-04 | 1.11E-04 |
| 97.40648 | 1.41E-04 | 1.41E-04 | 1.39E-04 | 1.10E-04 | 1.11E-04 | 1.11E-04 |
| 98.45387 | 1.41E-04 | 1.41E-04 | 1.39E-04 | 1.11E-04 | 1.11E-04 | 1.11E-04 |
| 99.50125 | 1.41E-04 | 1.41E-04 | 1.39E-04 | 1.12E-04 | 1.12E-04 | 1.12E-04 |
| 100.5486 | 1.42E-04 | 1.41E-04 | 1.39E-04 | 1.13E-04 | 1.13E-04 | 1.13E-04 |
| 101.596 | 1.42E-04 | 1.41E-04 | 1.39E-04 | 1.14E-04 | 1.13E-04 | 1.13E-04 |
| 102.6434 | 1.42E-04 | 1.41E-04 | 1.39E-04 | 1.15E-04 | 1.14E-04 | 1.14E-04 |
| 103.6908 | 1.42E-04 | 1.41E-04 | 1.40E-04 | 1.16E-04 | 1.15E-04 | 1.15E-04 |
| 104.7382 | 1.42E-04 | 1.42E-04 | 1.40E-04 | 1.17E-04 | 1.16E-04 | 1.16E-04 |
| | | | Data deliberately hidden to shorten data listing | | | |
| 124.6384 | 1.43E-04 | 1.42E-04 | 1.40E-04 | 1.28E-04 | 1.26E-04 | 1.26E-04 |
| 125.6858 | 1.43E-04 | 1.42E-04 | 1.41E-04 | 1.28E-04 | 1.26E-04 | 1.26E-04 |
| 126.7332 | 1.43E-04 | 1.43E-04 | 1.41E-04 | 1.28E-04 | 1.27E-04 | 1.27E-04 |
| 127.7805 | 1.43E-04 | 1.43E-04 | 1.41E-04 | 1.28E-04 | 1.27E-04 | 1.27E-04 |
| 128.8279 | 1.44E-04 | 1.43E-04 | 1.42E-04 | 1.28E-04 | 1.27E-04 | 1.27E-04 |
| 129.8753 | 1.44E-04 | 1.44E-04 | 1.43E-04 | 1.29E-04 | 1.27E-04 | 1.27E-04 |
| 130.9227 | 1.45E-04 | 1.44E-04 | 1.44E-04 | 1.29E-04 | 1.27E-04 | 1.27E-04 |
| 131.9701 | 1.46E-04 | 1.45E-04 | 1.45E-04 | 1.29E-04 | 1.27E-04 | 1.27E-04 |

Fig. 14

He Detection Times for Three Hole at Various Air Flow Rates Through Primary Tube – 70/88/93 feet
Times Observed Corresponding to Third Hole Location

| Time (s) | 5lpm #1 | 5lpm #2 | 4lpm #1 | 4lpm #2 | 3lpm #1 | 3lpm #2 |
|---|---|---|---|---|---|---|
| 0 | 1.24E-05 | 1.46E-05 | 1.84E-05 | 1.83E-05 | 2.25E-05 | 2.25E-05 |
| 1 | 1.25E-05 | 1.46E-05 | 1.84E-05 | 1.83E-05 | 2.25E-05 | 2.26E-05 |
| 2 | 1.25E-05 | 1.47E-05 | 1.84E-05 | 1.84E-05 | 2.26E-05 | 2.26E-05 |
| 3 | 1.25E-05 | 1.47E-05 | 1.84E-05 | 1.84E-05 | 2.26E-05 | 2.26E-05 |
| Data deliberately hidden to shorten data listing | | | | | | |
| 77 | 1.28E-05 | 1.48E-05 | 1.88E-05 | 1.86E-05 | 2.29E-05 | 2.26E-05 |
| 78 | 1.28E-05 | 1.48E-05 | 1.89E-05 | 1.86E-05 | 2.28E-05 | 2.26E-05 |
| 79 | 1.28E-05 | 1.48E-05 | 1.89E-05 | 1.86E-05 | 2.28E-05 | 2.26E-05 |
| 80 | 1.28E-05 | 1.48E-05 | 1.89E-05 | 1.86E-05 | 2.29E-05 | 2.26E-05 |
| 81 | 1.28E-05 | 1.48E-05 | 1.89E-05 | 1.86E-05 | 2.29E-05 | 2.26E-05 |
| 82 | 1.28E-05 | 1.49E-05 | 1.89E-05 | 1.86E-05 | 2.28E-05 | 2.26E-05 |
| 83 | 1.29E-05 | 1.50E-05 | 1.90E-05 | 1.86E-05 | 2.29E-05 | 2.26E-05 |
| 84 | 1.29E-05 | 1.52E-05 | 1.90E-05 | 1.86E-05 | 2.28E-05 | 2.26E-05 |
| 85 | 1.30E-05 | 1.54E-05 | 1.90E-05 | 1.86E-05 | 2.28E-05 | 2.27E-05 |
| 86 | 1.32E-05 | 1.58E-05 | 1.90E-05 | 1.86E-05 | 2.28E-05 | 2.27E-05 |
| Data deliberately hidden to shorten data listing | | | | | | |
| 101 | 2.14E-05 | 2.53E-05 | 1.91E-05 | 1.86E-05 | 2.28E-05 | 2.28E-05 |
| 102 | 2.20E-05 | 2.59E-05 | 1.91E-05 | 1.86E-05 | 2.28E-05 | 2.28E-05 |
| 103 | 2.25E-05 | 2.66E-05 | 1.91E-05 | 1.87E-05 | 2.29E-05 | 2.27E-05 |
| 104 | 2.31E-05 | 2.73E-05 | 1.91E-05 | 1.87E-05 | 2.29E-05 | 2.28E-05 |
| 105 | 2.37E-05 | 2.81E-05 | 1.91E-05 | 1.88E-05 | 2.28E-05 | 2.28E-05 |
| 106 | 2.43E-05 | 2.92E-05 | 1.92E-05 | 1.90E-05 | 2.28E-05 | 2.28E-05 |
| 107 | 2.50E-05 | 3.06E-05 | 1.93E-05 | 1.93E-05 | 2.29E-05 | 2.28E-05 |

Fig. 15

| Time (s) | 3lpm #1 | 3lpm #2 | 2lpm #1 | 2lpm #2 |
|---|---|---|---|---|
| 122 | 2.29E-05 | 2.29E-05 | 3.15E-05 | 3.14E-05 |
| 123 | 2.29E-05 | 2.29E-05 | 3.15E-05 | 3.14E-05 |
| 124 | 2.29E-05 | 2.29E-05 | 3.15E-05 | 3.14E-05 |
| 125 | 2.29E-05 | 2.30E-05 | 3.15E-05 | 3.14E-05 |
| 126 | 2.29E-05 | 2.31E-05 | 3.15E-05 | 3.14E-05 |
| 127 | 2.29E-05 | 2.32E-05 | 3.15E-05 | 3.14E-05 |
| 128 | 2.29E-05 | 2.35E-05 | 3.15E-05 | 3.14E-05 |
| 129 | 2.30E-05 | 2.38E-05 | 3.15E-05 | 3.14E-05 |
| 130 | 2.32E-05 | 2.43E-05 | 3.15E-05 | 3.14E-05 |
| Data deliberately hidden to shorten data listing | | | | |
| 167 | 4.85E-05 | 5.11E-05 | 3.15E-05 | 3.13E-05 |
| 168 | 4.94E-05 | 5.29E-05 | 3.15E-05 | 3.13E-05 |
| 169 | 5.05E-05 | 5.49E-05 | 3.15E-05 | 3.13E-05 |
| 170 | 5.18E-05 | 5.72E-05 | 3.15E-05 | 3.14E-05 |
| 171 | 5.34E-05 | 5.98E-05 | 3.15E-05 | 3.14E-05 |
| 172 | 5.52E-05 | 6.29E-05 | 3.15E-05 | 3.15E-05 |
| 173 | 5.74E-05 | 6.64E-05 | 3.17E-05 | 3.16E-05 |
| Data deliberately hidden to shorten data listing | | | | |
| 264 | 2.26E-04 | 2.13E-04 | 2.37E-04 | 2.39E-04 |
| 265 | 2.26E-04 | 2.13E-04 | 2.42E-04 | 2.44E-04 |
| 266 | 2.26E-04 | 2.13E-04 | 2.46E-04 | 2.48E-04 |
| 267 | 2.26E-04 | 2.13E-04 | 2.50E-04 | 2.52E-04 |
| 268 | 2.26E-04 | 2.13E-04 | 2.54E-04 | 2.56E-04 |
| 269 | 2.26E-04 | 2.13E-04 | 2.57E-04 | 2.59E-04 |
| 271 | 2.26E-04 | 2.13E-04 | 2.61E-04 | 2.62E-04 |
| 272 | 2.26E-04 | 2.13E-04 | 2.63E-04 | 2.64E-04 |

He Detection Times - Three Hole at Various Air Flow Rates Through Primary Tube - 70/88/93 feet
Times Observed Corresponding to Third Hole Location

LEAK LOCATION DETECTION SYSTEM

CROSS-REFERENCE

The present application is a U.S. National Stage application under 35 U.S.C. 371 of International Application Number PCT/CA2013/050261, filed in English on Mar. 28, 2013, which claims the benefit of and priority to U.S. Provisional Patent Application No. 61/618,208, filed Mar. 30, 2012, the entirety of each of which is incorporated herein by reference.

FIELD OF THE INVENTION

The present application pertains to a method of detecting and/or locating a leak in a primary pipe at least partially located within a secondary containment vessel. More particularly, the present application pertains to a method of leak detection and location whereby a tracer gas is introduced into the secondary containment vessel and detected in the primary pipe.

BACKGROUND

Piping systems having secondary containment are required for the transport of hazardous fluid substances. Secondary containment minimizes the risk of damaging the environment in the event of leakage from the primary pipe and can assist in stabilizing conditions in the primary pipe. The leakage of hazardous fluids even in small amounts over long periods of time can produce a serious environmental hazard which can be difficult to detect and difficult and expensive to clean up once it has ultimately been detected.

Secondary containment systems for piping are used in many industries where the fluid transported in the primary pipe is environmentally hazardous or where there is concern for the consequences of pipe leakage. In a secondary containment system, a secondary containment vessel surrounds the primary pipe. One particular example of a secondary containment system is where the secondary containment vessel is a substantially coaxial or concentric pipe of greater diameter than the primary pipe. This is known as a double-walled piping system. Double-walled piping systems comprise a primary, inner pipe that carries a fluid and an outer annular space between the outer surface of the inner pipe and the inner surface of the secondary containment pipe. This annular space surrounds the inner pipe so as to capture and contain any leaking fluid that exits in the inner pipe.

One application of double-walled piping systems is in service station environments where fuel is delivered to fuel dispensers from underground storage tanks with coaxial secondary containment pipes. Another application of double-walled piping systems is in cryogenic liquid transport pipelines. These are used to move super cooled liquidized fluids such as liquid natural gas. In order to maintain the super cooled condition of a cryogenic fluid within a cryogenic liquid transport pipeline, the pipeline is constructed with a central axially extending mainline pipe which carries the super cooled liquidized fluid and a concentric secondary containment pipe evacuated to provide a vacuum insulation for the primary pipe.

Yet another example of a piping system having secondary containment is one used in nuclear applications, sometimes termed Active Drain Systems (ADS), where radioactive liquid wastes are transferred from various sources to a common point. Such drainage systems comprise a primary drain pipe with an additional secondary pipe to act as a containment pipe in the event of leakage from the primary pipe. These also typically have an open ended drain pipe that is not designed to hold significant pressure. These pipe systems can be buried underground. These systems can also be sloped in order to allow fluids to flow under gravity, and may not be designed to retain or sustain pressure.

In some systems, the ADS pipe length is hundreds of feet long and buried underground and, consequently, cannot be directly inspected. As the primary pipe of such systems is not pressure rated, performing a pressure decay test by applying vacuum or pressure to such a system is not an option. Accordingly, a method for detecting leakage in the primary pipe of such a double-walled pipe system, and/or determining the location of a leak in such a system is highly desirable.

Several methods are currently used for leak detection in containment systems. The simplest methods include visual inspection and exposure of the leak site to soap bubbles to determine the leak location. Another method is acoustic leak detection, which includes detection of the noise generated by escaping fluid using microphones to identify a leak location. This technique is typically used where there are relatively high flow rates and the system is pressurized with a liquid. This method has been applied to underground water supply piping systems.

Another common test to determine if a system contains a leak is a pressure or vacuum decay test, wherein a closed system is pressurized or pumped to a partial vacuum condition. The system will gradually lose pressure or vacuum if a leak is present. This particular test cannot be performed on systems that are not designed to sustain pressure.

Another leak detection method utilizes the principle of pulsed energy reflection, wherein a change in impedance in an electrical conductor installed in the secondary containment will cause a change in signal. The presence of such a signal can be interpreted as a leak, and can also be used to determine the location of the leak. However, the sensitivity of this method is sometimes insufficient and often requires a major leak before actuating an alarm. This system has also been shown to be susceptible to false-alarms caused by moisture in the system that is not the result of a leak.

A need remains for a system and method that can detect leaks in the primary pipe, as well as the location of the leak(s). Knowledge of the location of the leak can help direct maintenance and/or allow improved efficiency in the repair of the leak. This is particularly true in buried systems or difficult to reach areas.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a method of detecting and locating a leak in a primary pipe that is at least partially within a secondary containment vessel. More particularly, the present application pertains to a method of leak detection and location comprising introducing a tracer gas into the secondary containment vessel and assaying for the detection of the tracer gas in the primary pipe.

In accordance with one aspect, there is provided a method for detecting at least one leakage site in a primary pipe having an inlet end and an outlet end, the primary pipe at least partially within a secondary containment vessel having an internal gas pressure greater than the internal gas pressure in the primary pipe, the method comprising:

introducing a tracer gas into the secondary containment vessel;

establishing a flow of gas from the inlet end to the outlet end of the primary pipe; and detecting the presence of the tracer gas at the outlet end of the primary pipe.

In accordance with one embodiment, the secondary containment vessel is a secondary pipe, which can be coaxial, or approximately coaxial, with the primary pipe In accordance with another embodiment, the tracer gas is diluted with a carrier gas, such as air or nitrogen. Non-limiting examples of suitable tracer gases are inert gases, such as helium and argon.

In accordance with another embodiment, the flow of gas is established in the primary pipe by introducing a carrier gas at the inlet end of the primary pipe.

In accordance with another embodiment, the flow of gas is established in the primary pipe by applying a vacuum to the outlet end of the primary pipe.

In accordance with another embodiment, the method is useful for detection of more than one leakage sites (e.g., at least two leakage sites).

In accordance with another embodiment, the primary pipe is a hazardous material transport system. The hazardous material can be, for example, a hydrocarbon fuel, hazardous waste material, coolant, and/or radioactive liquid waste.

In accordance with another embodiment, the primary pipe is in an active drainage system (ADS) or similar system.

In accordance with another embodiment, wherein the tracer gas is helium, the helium is detected with a helium sniffer probe.

In accordance with another aspect, there is provided a use of a method as described for detecting a leak site in a primary pipe.

BRIEF DESCRIPTION OF THE FIGURES

For a better understanding of the present invention, as well as other aspects and further features thereof, reference is made to the following description which is to be used in conjunction with the accompanying drawings, where:

FIG. 7 depicts the raw test data for the single hole test of He Detection Times for Single Hole at Various Air Flow Rates Through Primary Tube—100 feet;

FIG. 8 depicts the raw test data for the single hole test of He Detection Times for Single Hole at Various Air Flow Rates Through Primary Tube—100 feet—45 feet;

FIG. 9 depicts the raw test data for the He Detection Times for Single Hole at Various Air Flow Rates Through Primary Tube—15 feet;

FIG. 12 depicts the raw test data for the He Detection Times for Three Hole at Various Air Flow Rates Through Primary Tube—28/33/53.0 feet;

FIG. 13 depicts the raw test data for the He Detection Times for Three Hole at Various Air Flow Rates Through Primary Tube—28/33/53 feet; times observed correspond to third hole location;

FIG. 14 depicts the raw test data for the He Detection Times for Three Hole at Various Air Flow Rates Through Primary Tube—70/88/93 feet; times observed correspond to third hole location; and FIG. 15 depicts the raw test data for the He Detection Times—Three Hole at Various Air Flow Rates Through Primary Tube—70/88/93 feet; times observed correspond to third hole location.

DETAILED DESCRIPTION OF THE INVENTION

Definitions

Figure 1:
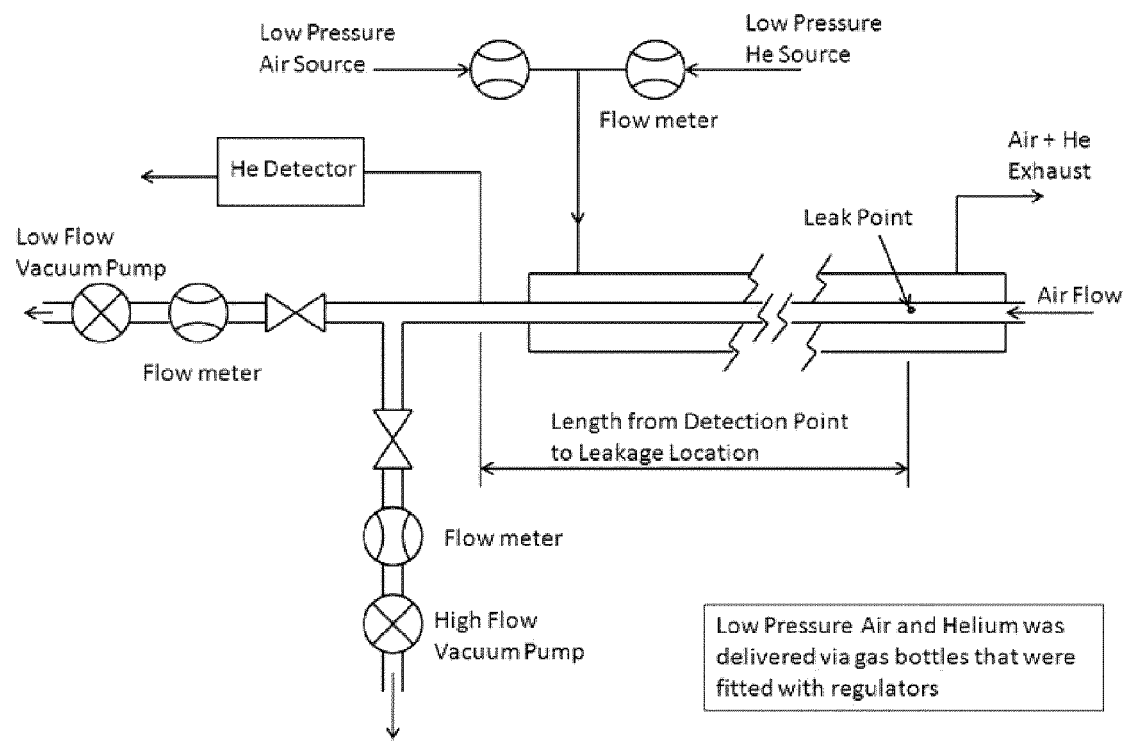
FIG. 1 is a schematic showing an example of test apparatus for determining leakage location.

Unless defined otherwise, all technical and scientific terms used herein have the same meaning as commonly understood by one of ordinary skill in the art to which this invention belongs.

As used in the specification and claims, the singular forms "a", "an" and "the" include plural references unless the context clearly dictates otherwise.

The term "comprising" as used herein will be understood to mean that the list following is non-exhaustive and may or may not include any other additional suitable items, for example one or more further feature(s), component(s) and/or ingredient(s) as appropriate.

The term "tracer gas" as used herein refers to the gas used for leak detection in accordance with the present methods. The tracer gas should be inert, nonreactive, and readily detectable. Some examples of tracer gasses are helium and argon.

The terms "pipe" and "tube" as used herein both refer to elongated structures as known in the art. These commonly have a circular cross-section. The pipe can be, for example, a drain pipe or transport pipe. To carry the tracer gas into the primary pipe, the pipe should be under slight vacuum or reduced pressure due to the air being drawn through it.

The term "primary pipe" as used herein refers to the primary containment or transport pipe. In some instances herein, the primary pipe is referred to as the "inner" pipe.

The term "carrier gas" refers to a gas that is plentiful in a system and used to contain and transport a less plentiful tracer gas. Some examples of carrier gasses include air and nitrogen.

The present application provides a method that utilizes an inert gas to detect leaks in a primary pipe at least partially contained within a secondary containment vessel. The method comprises introducing a tracer gas into the secondary containment vessel at some slightly positive pressure and detecting the presence (or absence) of the tracer gas in the primary pipe. By drawing (flowing) air through the primary pipe, the pressure inside of the primary pipe is lower than that of the secondary containment vessel due to the gas flow within the primary pipe. The tracer gas introduced into the secondary containment vessel will therefore be drawn into the primary pipe through any leak locations due to differential pressure.

The tracer gas will diffuse by molecular diffusion from a higher concentration to a lower concentration, or can be forced through the opening at the leak by a pressure differential. This can be achieved by pressurizing the secondary containment vessel or by applying a vacuum to the primary pipe.

The tracer gas that enters the gas flow in the primary pipe through the leak can be detected at the end of the primary pipe. By measuring the background level of tracer gas in the primary pipe prior to introducing the tracer gas into the secondary containment vessel, a change in the detected concentration of tracer gas indicates a leak in the primary pipe.

In double-walled piping systems where the secondary containment vessel is a coaxial secondary pipe, the tracer gas can be introduced into the annular gap between the primary and secondary pipes. In this case, tracer gas is introduced into the space between primary and secondary pipes (annulus) to form a carrier gas/tracer gas mix. Any breaches through the wall of the primary pipe allow the carrier gas/tracer gas mix to enter into the gas flow within the primary pipe. By inducing a gas flow in the primary pipe and using a suitably sensitive tracer gas detector at the primary pipe outlet, the detection of tracer gas in the primary pipe is indicative of a breach or leak in the primary pipe wall.

The pressures of tracer gas required in the secondary containment for the present method are relatively low, for example, in the range of 1-2 psig. Because the pressures of tracer gas required are low, the secondary containment vessel does not have to be pressure rated. In some applications, the secondary containment vessel does not even have to be closed to the environment. Any secondary containment vessel, even those unable to withstand elevated pressures, can be used with the present method.

Using this method, the location of the leak can be ascertained based upon the differential amount of tracer gas detected in the primary pipe caused by dilution into a varying carrier gas mass flow rate through the primary pipe. Specifically, the location of the leak can be ascertained using tracer gas inducement and detection. This can be achieved by introducing the tracer gas into the secondary containment vessel (or annular gap in the case of double-walled piping systems), and, in case of a leakage, allowing the tracer gas to be drawn into a carrier gas flowing in the primary pipe to obtain a stable detection reading of the tracer gas. By changing the flow rate of carrier gas through the primary pipe, the leakage location can be determined by measuring the time taken to record an increase in the amount of tracer gas detected. By calculating the flow velocity from primary pipe diameter and flow rate, a distance to the leakage point can be calculated based on the time taken to record the change in the amount of tracer gas reading from the point at which the flow rate was changed. Accordingly, the present method makes use of the residence time of the tracer gas when the conditions are changed inside the primary pipe to determine the location of the leak.

Helium, which is a naturally occurring gas present in the atmosphere, can be used as a tracer gas. However, because of the natural abundance of Helium, the instruments used in the present method will always 'detect' the baseline level of Helium. Accordingly, if Helium, or any other gas already present at detectable levels, is used as the tracer gas, the amount of tracer gas to be detected should be significantly higher than the ambient level so the difference in the amount of tracer gas can be accurately detected.

The tracer gas can be diluted with a carrier gas. Suitable carrier gases have similar properties to the tracer gas but are not detected by the detector. One preferable carrier gas is air, due to its availability, however, any gas can be used as a carrier gas provided that it does not affect or interfere with the detection equipment reading of the tracer gas, or cause any negative effects to the system under test. The need to dilute the tracer gas depends on what detection system is being used to detect the tracer gas. Specifically, the tracer gas concentration in the primary pipe should be between the lower and upper limits of detectability for the tracer gas detector. For example, when helium is used as the tracer case, the He detector used has a range of detection between $1 \times 10^{-7}$ to approx. $1 \times 10^{-4}$ atm cc/sec of He. The tracer gas detected within the primary pipe should be well below the maximum detection limit when setting background starting conditions.

The background conditions in the primary pipe are established by pressurizing the secondary containment vessel or annulus with a low pressure (approx. 1-2 psig) mix of tracer and carrier gas. In the presence of a leak, carrier gas and/or tracer gas is drawn through the leak in the primary pipe via a combination of the pressure difference between the pressurized annulus or secondary containment vessel and the primary pipe, which is under slight vacuum due to the air being drawn through it.

The variables of tracer and carrier gas in the primary pipe can be set by changing the ratio of carrier gas to tracer gas into the annulus or secondary containment vessel, the pressure in the annulus or secondary containment vessel and the vacuum inside the primary pipe. By changing these variables the starting condition of tracer gas can be established and can be measured to ensure it is in within the limits of the detection equipment. Once this has been set, the detection of tracer gas can be measured and once a steady state value has been set as a background condition, the flow rate of gas in the primary pipe can be changed. By providing a signal showing the switch from a relatively high flow rate (starting steady state condition) to a lower flow rate, or from a low flow rate to a higher flow rate, the residence time of the tracer gas from this switch to when the detector senses a change in tracer gas concentration can be taken. The tracer gas detector reading will change when any new concentration reaches the detector. By calculating the flow velocity (from primary pipe diameter and measured flow rate of gas in the primary pipe) a distance to any leakage point can be predicted.

It can also be useful to have a range of tracer gas readings between the lower and upper limit of the detection equipment during the switching of gas flow rate. If there is only a single leakage location, there will be a corresponding increase in tracer gas detection when the switch from high flow to low flow occurs. If the amount of tracer gas is too great, the detection reading will become saturated. Provided there is sufficient detectable region left in the range of tracer gas detection, this would be acceptable for a single leak point. If there is any more than one leak site in the pipe, additional changes (increases in tracer gas) are observable in the detector when any change in concentration of tracer gas detection reaches the detection system. Thus when there are multiple leaks in the primary pipe, sufficient range within the detection equipment allows for the identifications of additional leakage points. In this way it is possible to identify multiple leak sites if they exist in the primary pipe.

The described methods can also be used for preventative maintenance. Specifically, the integrity of a primary pipe can be investigated for the presence of a breach or leak. The presence, size, as well as the location of the leak, can be identified prior to pipe replacement or repair to the pipe. Such methods are especially useful in buried, underground or difficult to reach piping systems. Also, by correlating the tracer gas detection level with actual hole sizes, the present method can provide an estimate of the size of the leak. This enables preventative maintenance to be carried out over set periods of time to determine if the detected sites of leakage are stable or growing larger. If any repairs or excavation work is required, the location and size of the leak can be readily detected, minimizing the effort and disruption to repair the leak.

While the present method is particularly applicable to leakage detection in double-walled pipe assemblies used in the petroleum, chemical, nuclear, and natural gas industries, it should be appreciated that the presently described methods can also be utilized in connection with all types of pipe installations having a secondary containment vessel in which leakage of a hazardous fluid may occur.

To gain a better understanding of the invention described herein, the following examples are set forth. It should be understood that these examples are for illustrative purposes only.

EXAMPLE 1

Detection of He in a Single-Walled Pipe

He was detected using a Varian 979 He mass spectrometer with a Varian Power Probe Sniffer. This instrument works by continuously drawing a small and steady gas mixture into a vacuum chamber and then measuring the volumetric flow rate of helium present in the gas mixture and displaying the results as atmospheric cc's of helium per second.

The leak detector probe (sniffer) is an attachment containing a small orifice sized to allow the vacuum pumps within the mass spectrometer to maintain high vacuum, and does not control the actual gas mixture flow rate. What is detected, therefore, is a relative value that is used to determine changes in concentrations rather than actual gas flow rates. The Varian 979 unit can provide measurements of He from atmospheric background (approximately 5 ppm by volume which was indicated is $1\times10^{-6}$ atm cc/s on the mass spectrometer during testing) to higher orders of magnitude above this before becoming saturated (indicated maximum value on the mass spectrometer is $9.9\times10^{-4}$ atm cc/s).

EXAMPLE 2

Setup for Leak Detection

Test equipment was built to model a system comprising a primary pipe having secondary containment. The model system is similar to that of a standard double-walled piping system. The same setup is similar to that which could be applied to any piping system having secondary containment. FIG. 1 shows the general arrangement and the schematic layout of the major test components used in trials of the presently described method. The test apparatus included an outer tube representing the secondary containment pipe. Gas bottle helium and air sources were connected to the outer tube to enable a controlled mix of air and helium to enter the annular space between the inner and outer tubes. An exhaust was added to the outer tube to allow the helium/air induced gas flows to freely exit the annulus to establish a stable concentration within it. The inlet and outlet lines supplying and exhausting helium and air into the annulus were via brass connections on either end of the outer tube.

The secondary containment vessel (or secondary pipe) was in the form of a 2 inch diameter plastic tube approximately 100 feet in length. The primary pipe was a 0.75 inch internal diameter plastic tube that protruded both ends of the outer tube. The primary pipe was fitted and sealed to the ends of the outer tube. At the outlet end of the inner tube there were two alternative flow paths. One path was set up to provide a relatively high flow rate for the initial steady state helium detection reading, and the other path set up to provide a lower flow rate to achieve a higher concentration of helium.

"Rotameter" type flow meters were used to record the two flow settings. Two 90° manually operated shut off valves were fitted to both the high flow and low flow paths to enable one or the other flow paths to be used at one time. Both flow paths through the primary pipe were drawn via shop air that delivered flow to high and low flow vacuum pumps.

Flow rates in the bench top tests were scaled to replicate practical flow velocities within the primary pipe. These same air flow velocities can also be used in the field in other similar systems. Air flow meters were used to measure air flow through the primary pipe. Two vacuum pumps were connected to the primary pipe: one inducing relatively high flow rates and the other relatively low flow rates that could be rapidly switched from one to the other. Helium detection equipment consisted of a helium "sniffer" probe connected to the outlet end of the inner tube and the helium leak detector, as previously described. Various gas flow meters were connected to a computer to record helium detection readings against time.

EXAMPLE 3

Method for Leak Detection

With the flow of helium and air being introduced into the annulus and once the initial stabilised low flow rate helium reading was established, the gas valves were simultaneously actuated. During each test a computer connected to the helium leak detector recorded helium readings at one second intervals.

As mentioned above, a mixture of helium and air was injected into the annulus through a port at one end of the annulus and allowed to exhaust from the exhaust port at the downstream end of the annulus. The helium detector was attached to a port in the primary pipe to determine the amount of helium present in the primary pipe, and air was drawn through the primary pipe at the high flow rate setting while flow rates of the mixture of helium into the annulus were adjusted to keep the amount of helium detected in the primary pipe in the $1\times10^{-6}$ to $5\times10^{-5}$ atm-cc/sec range. When the helium detected in the primary pipe stabilized (indicating the concentration of helium in the annulus had stabilized) flow rates and pressures in the mixture of helium supply to the annulus, and helium detector test port pressure, were recorded.

Data was captured on a computer to record helium detection readings. After the helium detector reading stabilized at the high flow rate, the air flow through the primary pipe was rapidly switched to a lower flow rate and the time of this switch was recorded. After the reading on the helium detector increased and stabilized, the time and helium concentration of stable reading was recorded. The flow rate in the primary line then was set back to the high flow rate and the time of the flow switch was recorded. After the helium detector reading dropped back to the pre-test reading and stabilized, the data acquisition was stopped and the file was saved.

Figure 2:
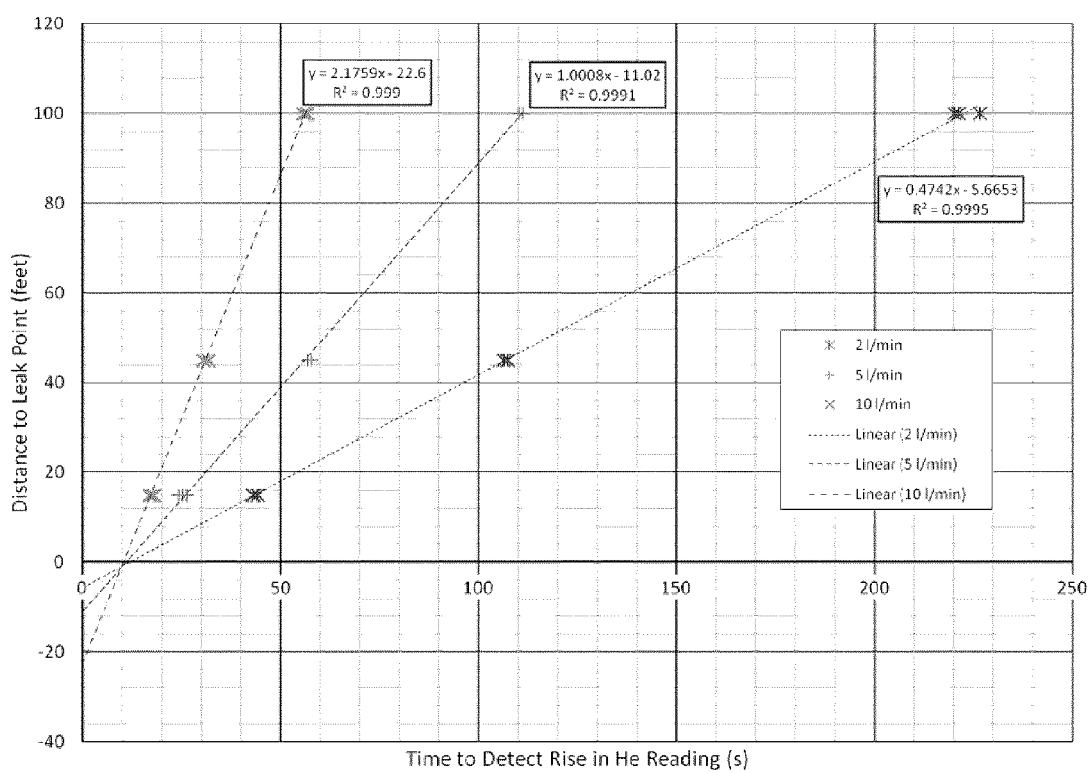
FIG. 2 graphically depicts Distance to Point of Leakage v Time to Detect Rise in He and Primary Gas Flow Rate.
Figure 3:
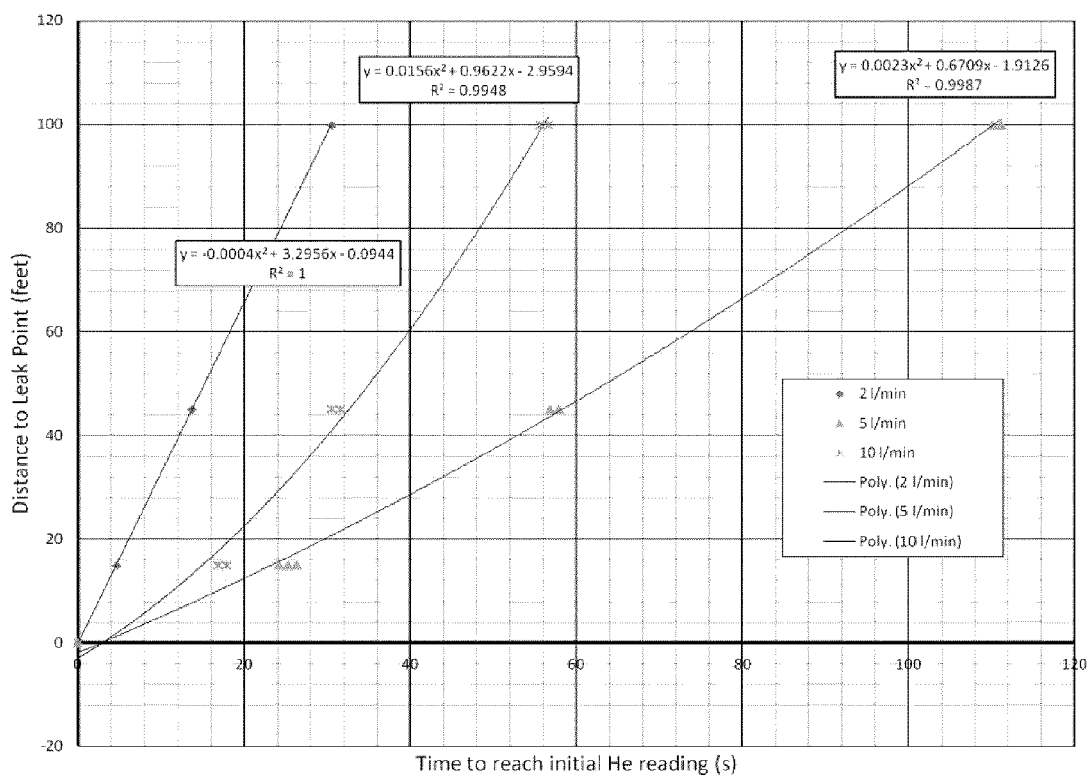
FIG. 3 graphically depicts Time to Detect He v Flow Rate and Distance to Point of Leakage—Zero Values Added.

Readings taken for each test can include: the annulus pressure, the high and low primary tube flow rates, the tracer/carrier gas concentrations, the helium detector test port pressure, the high flow helium reading, the time to switch from high flow to low flow and then back to high flow, and the stabilised helium reading. FIG. 2 shows the time to detect He versus flow rate and distance to point of leakage.

EXAMPLE 4

Correlation of Leak Site to Air Flow Rate

The scaled reduction of the cross sectional area can be calculated:

Pipe Flow Area ratio=$0.75^2/3^2$=1/16:

For a 50 l/min air flow rate that could practically be used within the actual ADS primary pipe the scalable flow rate for testing was calculated to be 3.1 l/min as follows:

$$\text{Test Air Flow} = \frac{50 \, l/\min}{16} = 3.1 \frac{l}{\min}$$

The actual range of test flow rates used in the tests were between <1 l/min up to 10 l/min for the low air flow rate range and from 20 to 60 l/min for the higher air flow rate range as shown by Table 1, below.

The air flow rate through the inner tube was set up prior to each test such that the air flow rate at both the high flow and low flow regimes were known before switching occurred.

EXAMPLE 5

Single and Multiple Hole Tests

Testing of the concept was shown using a single tube to represent the primary pipe. For these tests helium was injected into a known air flow rate at one end of the tube and a helium detector was connected at the outlet end of the tube. Results demonstrated that the transition from an initial background concentration of helium to a higher level is distinguishable by the detector. Accordingly, this setup has the potential of determining if a leak is present in the primary pipe. There was a close correlation between the tube length and the residence time of He inside each length of pipe tested.

Depending on the test there was either a single hole or three holes machined into straight connectors that were inserted and sealed within the inner tube/pipe. The axial location of the hole(s) and other criteria used in the tests are listed in Table 1.

Using the present method, it was possible to detect multiple leak points in a primary pipe. Into a quarter scale diameter primary pipe, holes at various locations were machined into the inner tube/pipe. Holes of known sizes were machined into fittings at known locations in the inner tube/pipe representing leak holes in the primary pipe. The correlation between a leakage location corresponding to a location of a single hole and the He detection time for a pipe in a pipe system for a single leak hole among multiple leak holes was determined.

A straight line correlation between the time to detect helium and the distance to the leak for flow rates of 2, 5 and 10 l/min was established. The results of this test are shown in FIG. 2. However, these fitted straight lines did not pass through the origin. By adding a data point at the origin and using a polynomial fitted curve an acceptable correlation was established where the error in distance to leakage was within 3 feet. Since an excavation bucket is expected to be greater than 3 feet the correlation obtained in this report would likely be acceptable since the actual leak could be readily verified visually within this distance. From the test results it was established that it is possible to detect multiple leak paths.

TABLE 1

Criteria for Single and Multi Hole Tests

| Test # | Test Description | Hole Diameter (0.001 inches) | Hole Distance (feet) | Air Flow Rate Low/High l/min | # Tests |
|---|---|---|---|---|---|
| 1 | Single Hole | 16 | 100 | 2/20 | x3 |
| 2 | Single Hole | 16 | 100 | 5/50 | x3 |
| 3 | Single Hole | 16 | 100 | 6/60 | x1 |
| 4 | Single Hole | 16 | 45 | 6/60 | x3 |
| 5 | Single Hole | 16 | 45 | 2/20 | x3 |
| 6 | Single Hole | 16 | 45 | 5/50 | x3 |
| 7 | Single Hole | 16 | 45 | 10/50 | x3 |
| 8 | Single Hole | 16 | 15 | 2/20 | x3 |
| 9 | Single Hole | 16 | 15 | 5/50 | x3 |
| 10 | Single Hole | 16 | 15 | 10/50 | x3 |
| 11 | Three Holes | 40/25/16 | 28/33/53 | 5/50 | x3 |
| 12 | Three Holes | 40/25/16 | 28/33/53 | 4/40 | x3 |
| 13 | Three Holes | 40/25/16 | 28/33/53 | 3/30 | x3 |
| 14 | Three Holes | 40/25/16 | 28/33/53 | 2/20 | x3 |
| 15 | Three Holes | 40/25/16 | 28/33/53 | <1/10 | x3 |
| 16 | Three Holes | 16/25/40 | 75/95/100 | 5/50 | x2 |
| 17 | Three Holes | 16/25/40 | 75/95/100 | 4/40 | x2 |
| 18 | Three Holes | 16/25/40 | 75/95/100 | 3/30 | x2 |
| 19 | Three Holes | 16/25/40 | 75/95/100 | 2/20 | x2 |
| 20 | Three Holes | 16/25/40 | 75/95/100 | <1/10 | x2 |

Single Hole Tests

Data was taken at second intervals for the single hole tests at 100, 45 and 15 feet respectively. Times are used to calculate distance to the leak site. The key parameter is the time at which the helium just starts to rise above the background reading. These values are summarized in Table 2.

TABLE 2

Time to Detect Increase in Helium Detection after Switch from High Flow to Low Flow

| Leak Location m and (feet) | Time to Detect Rise in He after Switching from High to Low Flow Rate (s) Flow Rate (L/min) | | | | |
|---|---|---|---|---|---|
| | 2 | 3 | 5 | 6 | 10 |
| 4.6 (15) | 43.16 | | 24.2 | | 16.84 |
| 4.6 (15) | 44.21 | | 25.3 | | 16.84 |
| 4.6 (15) | 43.16 | | 26.3 | | 17.9 |
| 13.7 (45) | 106.3 | | 57.9 | 47.4 | 31.6 |
| 13.7 (45) | 107.4 | | 56.8 | 50.53 | 30.5 |
| 13.7 (45) | 107.4 | | 56.8 | 47.4 | 31.6 |
| 30.5 (100) | 220.3 | 163.6 | 110.1 | | 56.6 |
| 30.5 (100) | 221.3 | 164.7 | 111.2 | | 55.6 |
| 30.5 (100) | 226.6 | 163.6 | 110.1 | | 56.6 |
| 30.5 (100) | | 164.7 | | | |
| 30.5 (100) | | 165.7 | | | |

Additional tests were carried out at 3 and 6 l/min flow rate. The objectives of establishing the location of a single leakage point is based on data obtained using 2, 5 and 10 l/min low flow regime flow rates. As per the information obtained in Table 2, there were 3 tests performed at 3 flow rates and 3 leak locations.

For each data set (tube length and flow rate) it can be observed the fitted straight lines have an $R^2$ (where $R^2$ is the sum of all R values squared and R=difference between observed value and fitted value for each data point) value of greater than 0.99 resulting in a strong straight fit for all three flow rates tested. It can be observed that the lines do not go through the origin but converge at 11.1 seconds (the average of 11.93, 11.03 and 10.35 seconds) on the zero "Distance to Leak" axis for all low flow rate conditions plotted.

It is noted the times to detect the change in helium readings was consistent. Typically the time of the rise in helium detection readings was within approximately 1 second with the exception of one test for the 100 foot length of tube at the lowest flow rate. At the 5 and 10 l/min flow rates at this length the times were within one second of each test condition.

Figure 4:
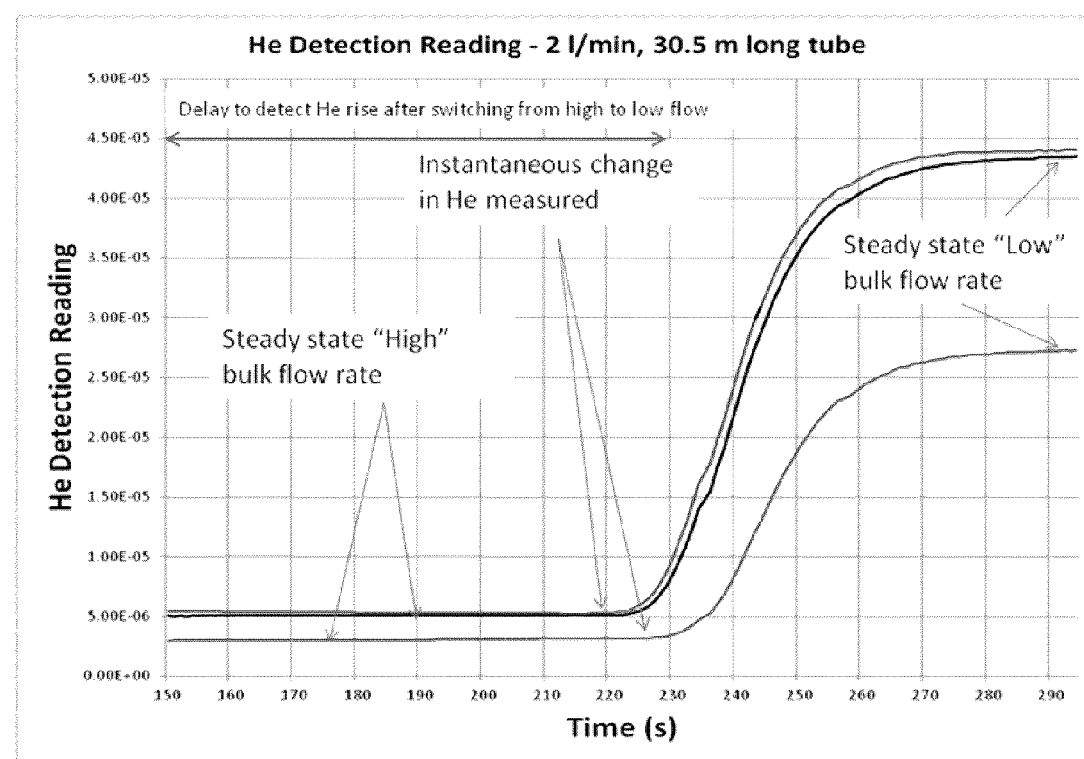
FIG. 4 graphically depicts a plot of helium detection history from the point of switching from a "high" to "low" bulk gas flow rate for the three tests performed at 2 l/min flow rate through the primary pipe.
Figure 5:
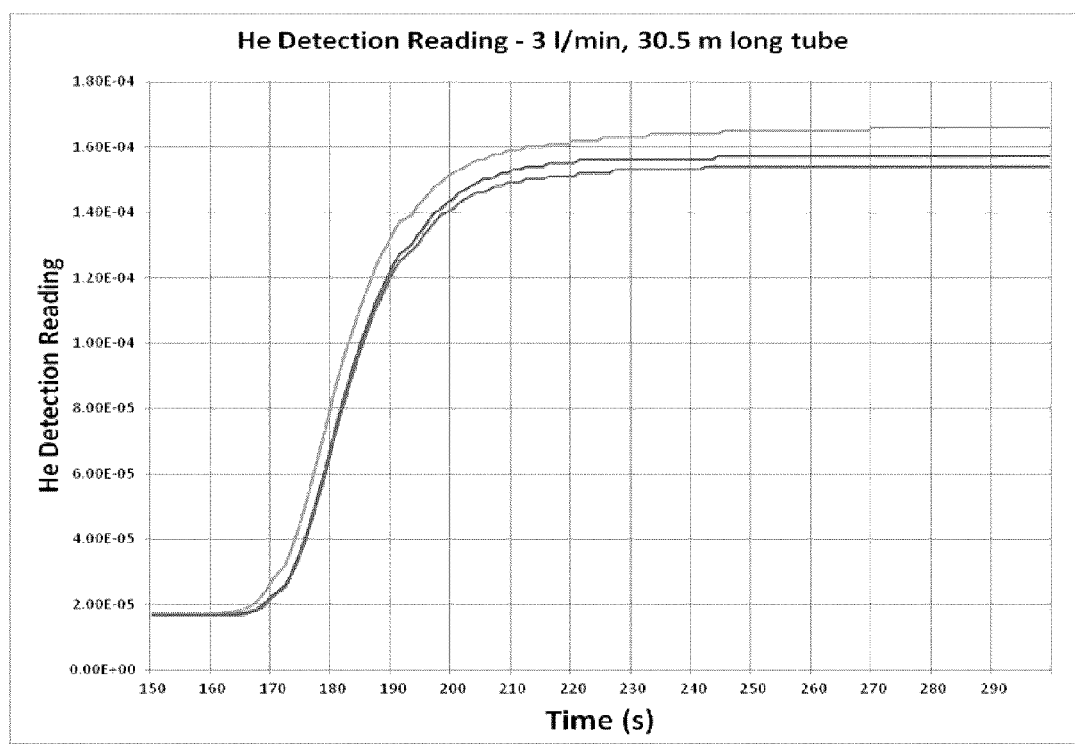
FIG. 5 graphically depicts the He Time History for Single Hole 30.5 m Long Tube at 3 l/min "Low" Flow Rate.
Figure 6:
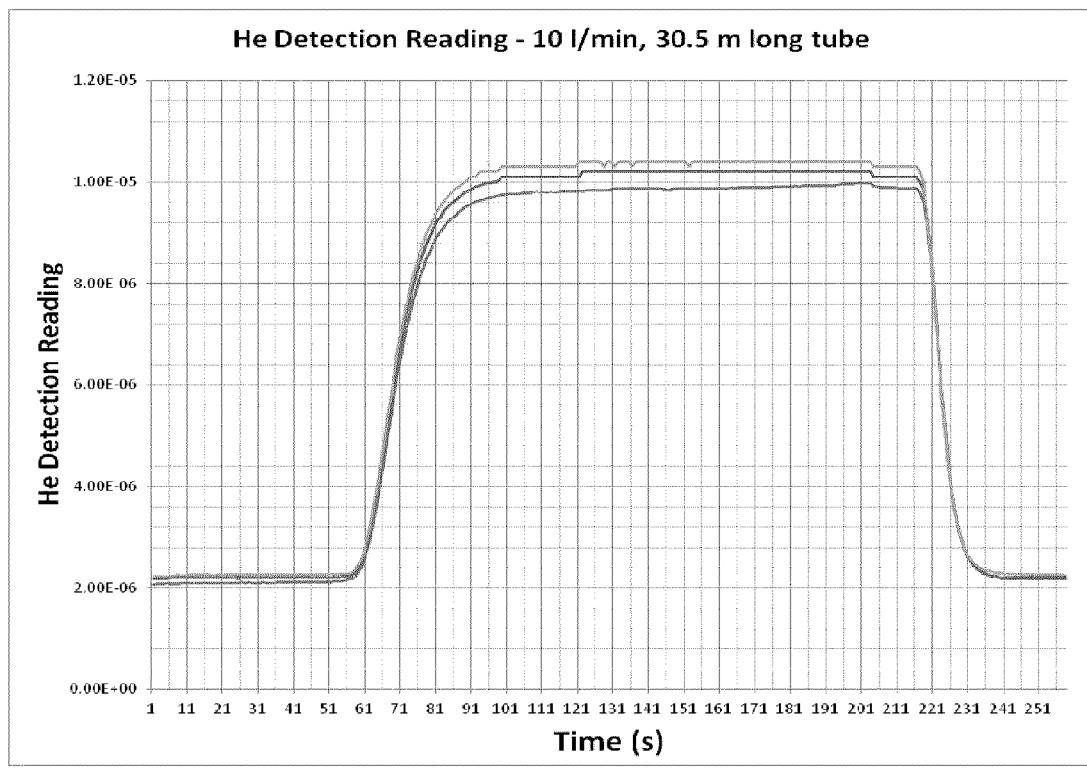
FIG. 6 graphically depicts the He Time History for Single Hole 30.5 m Long Tube at 10 l/min "Low" Flow Rate.

The obtained data is represented graphically profiles for the 3, 5 and 10 l/min flow rates as shown in FIGS. 4-6, respectively. The raw test data for all the single hole test results is shown in FIGS. 7-9.

The repeatability of each test can be assessed on the three runs chosen for each flow rate. Shown in FIG. 4, two of the test runs are almost coincident and one test slightly lags (onset of detecting helium) the other. In the test run that lags the other two it can be noted that the starting concentration in the "high" flow regime is less than the other two. One possible explanation is that the natural diffusion rate of helium in air is expected to be lower for lower He concentrations than for higher He concentrations.

Multiple Hole Tests

Figure 10:
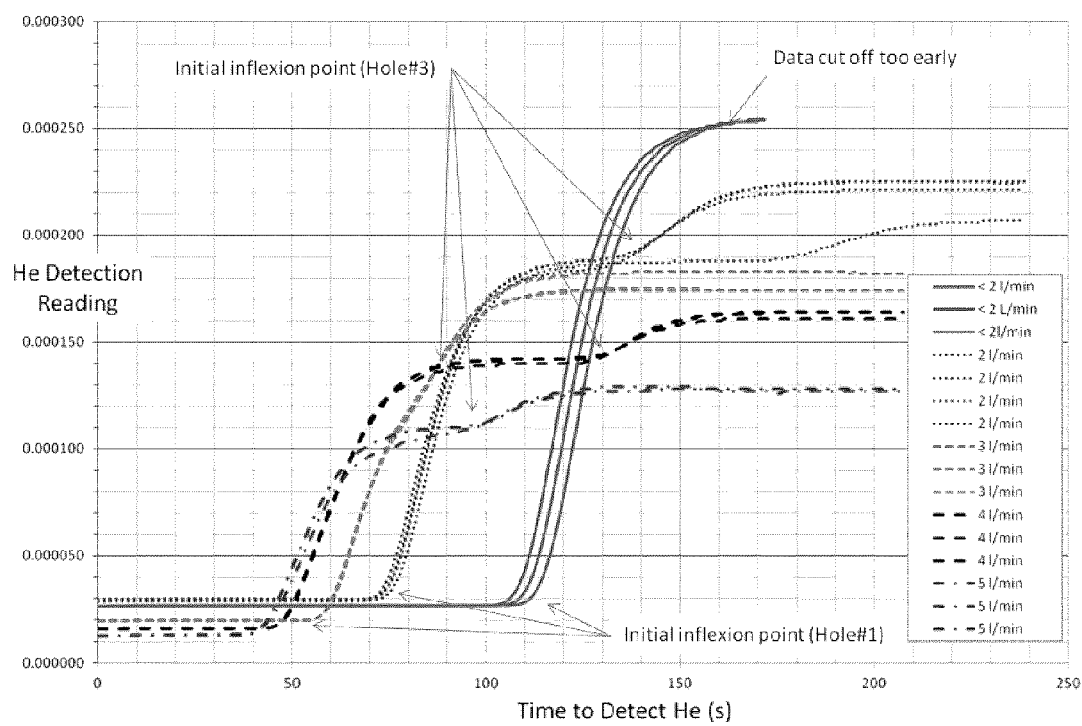
FIG. 10 depicts graphically depicts the He Detection for Three Holes at Leak Locations 8.5, 10 and 16 m.
Figure 11:
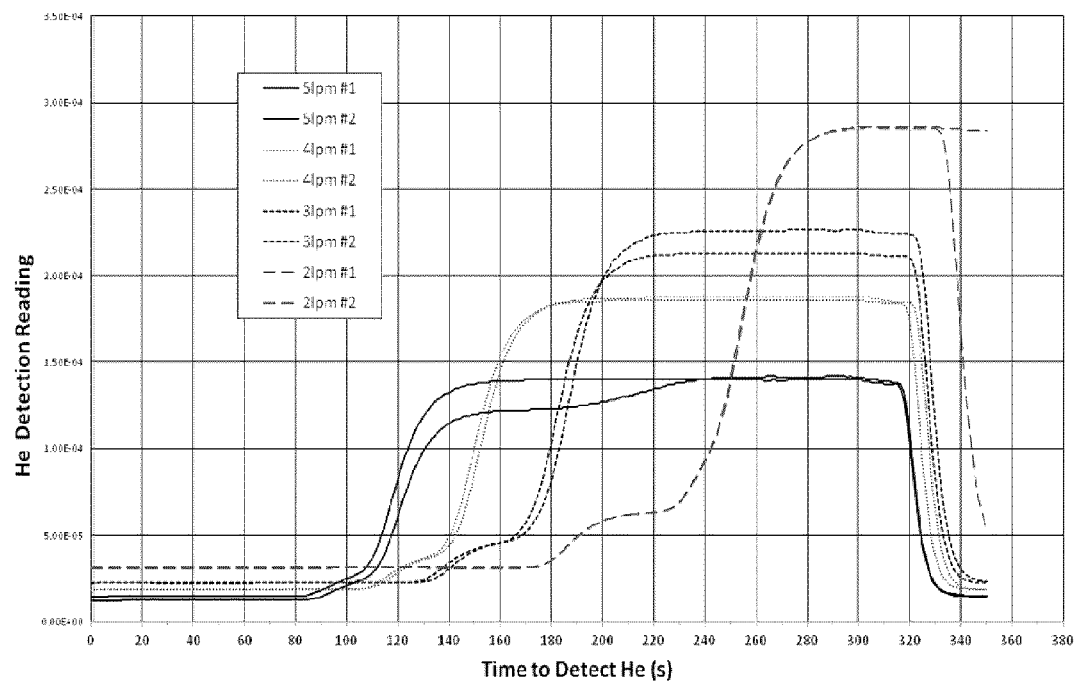
FIG. 11 depicts graphically depicts the He Detection for Three Holes at Leak Locations at 22.9, 30 and 30.5 m.

Tests were carried out with two sets of holes located at 28, 33 and 53 feet and also at 75, 95 and 100 feet in line with Table 1. FIG. 10 shows that there are two changes in the He detection profiles, indicating that two locations of leakage in the primary tube wall were identified. For example, the 4 l/min low air flow rate curves show three distinctive plateaus (stable He readings): one at the beginning of the test, one at 43 seconds and another after 129 seconds. The obtained data is also represented graphically in FIG. 11. The raw test data for all the multiple hole test results is shown in FIGS. 12-15.

Data Correlation

From the previous section it was established that for each flow rate there was an excellent correlation of leak site location versus time. The correlation between predicted distance and time recorded for three indicated flow rates of 2, 5 and 10 l/min was analysed. Microsoft Excel software was used to regress the data. Table 3 summarises the correlation of the predicted distance, D, using the formula:

$$D=1.14(t-t_o)v$$

Where:

t=the recorded time to change flow rate (seconds)

$t_o$=a value for the offset (11.1 seconds) for the tests performed, and v=gas velocity in the pipe (ft/s).

This regression is also based on adjustments to the flow rate measurements since there was a significant error with the flow meter used for the tests. The low flow regime rotameter error was +/−3% of the full scale reading of 24 l/min that results in a +/−0.72 l/min uncertainty of all the flow meter readings. The best correlation to fit the three tested flow rates, using the formula above, was based on flow rates of 2.19, 4.6 and 10.1 l/min.

TABLE 3

Regression of Predicted Distance against Time Recorded

| Hole Location ft | Time recorded at | | | Prediction D = A(t-t₀)v | | | Error = Abs(D-Location) | | |
| --- | --- | --- | --- | --- | --- | --- | --- | --- | --- |
| | 2 l/min | 5 l/min | 10 l/min | 2 l/min | 5 l/min | 10 l/min | 2 l/min | 5 l/min | 10 l/min |
| 15 | 43.16 | 24.2 | 16.84 | 15.4 | 13.2 | 12.7 | 0.36 | 1.82 | 2.32 |
| 15 | 44.21 | 25.3 | 16.84 | 15.9 | 14.3 | 12.7 | 0.86 | 0.71 | 2.32 |
| 15 | 43.16 | 26.3 | 17.9 | 15.4 | 15.3 | 15.0 | 0.36 | 0.29 | 0.02 |
| 45 | 106.3 | 57.9 | 31.6 | 45.6 | 47.1 | 45.3 | 0.60 | 2.09 | 0.29 |
| 45 | 107.4 | 56.8 | 30.5 | 46.1 | 46.0 | 42.9 | 1.13 | 0.98 | 2.14 |
| 45 | 107.4 | 56.8 | 31.6 | 46.1 | 46.0 | 45.3 | 1.13 | 0.98 | 0.29 |
| 100 | 220.3 | 110.1 | 56.6 | 100.2 | 99.6 | 100.5 | 0.21 | 0.39 | 0.52 |
| 100 | 221.3 | 111.2 | 56.6 | 100.7 | 100.7 | 100.5 | 0.69 | 0.72 | 0.52 |
| 100 | 226.6 | 110.1 | 56.6 | 103.2 | 99.6 | 100.5 | 3.23 | 0.39 | 0.52 |
| | | | | | | Total error = | 8.56 | 8.37 | 8.93 |

Flow area = 0.003068 ft²     0.000285

Flow l/min = 2.19    4.6    10.1 adjusted

= 0.077347    0.162464    0.356715 ft³/s    3.65E−05

= 0.420188    0.882586    1.937853 ft³/s    0.12806

$t_0$ = 11.1 s

D = Estimated Leak Location (ft)

A = Fitted parameter (dimensionless) ... Should be close to 1.0

= 1.14

EXAMPLE 6

Field Tests

The test method included a baseline test where air was drawn through the primary drain line/pipe from a single source, specifically an open floor drain (ADS). Other connections to the primary floor drain were sealed. Draw of air through the primary pipe of the drain was via suction of a hose connected to the test equipment. The test equipment comprised a helium sniffer probe, flow meters and control valves to switch from high to low flow of the air.

Helium was introduced into the primary drain pipe of the ADS by inserting a He line into the a standpipe at that location. The air flow rate within the primary drain pipe of the ADS was switched from a high flow regime to a low flow regime, while maintaining a helium flow into the primary drain pipe of the ADS constant, and recording a time to detect the change in He reading. The time recorded served as a reference that was needed to establish the leakage location. A data acquisition system was employed to record the point in time the switch occurred from high to low flow (via ball valve switches) and also recorded the time history of the He reading in 0.5 sec intervals. The results of the time to detect a rise in He when switching from high to low flow rate for the baseline condition are shown in Table 4.

TABLE 4

| Test # | Lower Flow rate (l/min) | Time for He rise (s) |
|---|---|---|
| 1 | 58 | 112.5 |
| 2 | 57 | 117 |
| 3 | 57 | 114.5 |
| 4 | 57 | 116.5 |

The mean time of the baseline reference point was 115 s.

Leakage Location Test

A flow meter was fitted at the exit of the drain so the flow rate could be accurately measured. Subsequent testing was performed on both the short and long leg of the ADS where air flowed through the primary drain pipe of the ADS, and He was induced into the annulus of the ADS. Tests were carried out in much the same manner as with the bench top tests. Helium was introduced to the annulus under low pressure. The hose was run from the drain exit to the He sniffer probe. Two inductor pumps were placed at the end of the hose.

The particular inductor pumps used work on the Bernoulli principle as follows: Air from a compressed air bottle was made to flow straight through a T piece, allowing the vacuum thereby created in the other connection to the T piece to draw air through a connection to the primary drain pipe. One inductor pump had a high flow range and the other a low flow range. Switching from one inductor pump to the other created the flow switch similar to that employed in the bench top tests.

In this case the leak location was unknown. Accordingly, the leak location had to be determined by observing the time difference once the flow switch was made. 90 degree valves with actuators were incorporated that generated a signal that was used as a reference point. When the switch was made from high to low flow rate, the time taken for the helium detector to sense a change in helium detection reading was measured.

The primary drain was accessible via a connection that went above ground, called a stand pipe. The standpipe was used to establish a baseline reading. A number of repeated tests were carried out and the time to detect a change in the He reading, when switching from high flow to low flow settings, were recorded as shown in Table 5, below. Table 5 summarizes the time difference to the leakage location from the baseline reference time. Also included is the leakage location point which was calculated at a distance downstream from where the standpipe connects to the primary drain line.

TABLE 5

Short leg

| Test # | Flow rate (l/min) | Time for He rise (s) | Area of Pipe $(m^2) \times 10^{-3}$ | Pipe gas velocity (m/s) | Time difference to baseline (s) | Leakage Location from baseline (m) |
|---|---|---|---|---|---|---|
| 1 | 60 | 39.5* | 8.219 | 0.121 | 68.5 | 8.29 |
| 2 | 60 | 49.5 | 8.219 | 0.122 | 65.5 | 7.99 |
| 3 | 58 | 49 | 8.219 | 0.118 | 66 | 7.79 |

The velocity, used to calculate distance, was calculated from the indicated flow rate. Another way to predict the distance of the leak is to use the knowledge of the geometry of the system and the time measured to record a change in helium concentration. By knowing the drain pipe diameter and the diameter of the hose connecting the drain to the sniffer probe, a distance can be calculated without measuring the flow rate.

The repeatability of the tests results is demonstrated as shown in the long and short leg tables (Tables 5 and 6, respectively).

TABLE 6

Long leg

| Test # | Flow rate (l/min) | Time for He rise (s) | Area of Pipe $(m^2) \times 10^{-3}$ | Pipe gas velocity (m/s) | Time difference to baseline (s) | Leakage Location from baseline (m) |
|---|---|---|---|---|---|---|
| 1 | 59 | 47.5 | 8.219 | 0.122 | 67.5 | 8.24 |
| 2 | 56 | 48 | 8.219 | 0.115 | 67 | 7.71 |
| 3 | 55 | 49 | 8.219 | 0.111 | 66 | 7.33 |

The leakage location was calculated based on the knowledge of the air flow rate, the diameter of the primary drain and the difference in time to detect He between the reference condition (baseline) and that measured in the leakage location tests when He was induced in the annulus. The following is an example of how the leakage location was calculated and is based on Test #2 of the short leg tests shown in Table 5.

The air flow rate was provided by readings directly from the flow meter:

$$Q = 60 \text{ l/min} = 1 \times 10^{-3} \text{ m}^3/\text{s}$$

Area of the primary drain pipe was calculated from the diameter of 4" schedule pipe:

$$A = Pi/4 \times (0.1023)^2 = 8.219 \times 10^{-3}$$

Velocity in the pipe:

$$u = Q/A = 1 \times 10^3 / 8.219 \times 10^3 = 0.122 \text{ m/s}$$

Distance to leakage site:

$$L = u \times \text{time} = 0.122 \times 65.5 = 7.99 \text{ m}$$

The mean average of the distance from the reference location to the leakage point downstream is 7.9 m.

The present method of predicting a leakage location shows great promise based on the linear relationship established between the leak site location and the time to detect a change in helium concentration, for each of the three indicated flow rates used in the analysis.

All publications, patents and patent applications mentioned in this Specification are indicative of the level of skill of those skilled in the art to which this invention pertains and are herein incorporated by reference to the same extent as if each individual publication, patent, or patent application was specifically and individually indicated to be incorporated by reference.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The embodiments of the invention in which an exclusive property or privilege is claimed are defined as follows:

1. A method for detecting at least one leakage site in a primary pipe having an inlet end and an outlet end, the primary pipe being at least partially within a secondary containment vessel having an internal gas pressure greater than an internal gas pressure in the primary pipe, the method comprising:
    introducing a tracer gas into the secondary containment vessel;
    establishing a flow of gas from the inlet end to the outlet end of the primary pipe; and
    detecting presence of the tracer gas at the outlet end of the primary pipe.

2. The method of claim 1, wherein the secondary containment vessel is a coaxial pipe.

3. The method of claim 1, wherein the tracer gas is diluted with a carrier gas.

4. The method of claim 1, wherein the tracer gas is helium or argon.

5. The method of claim 1, wherein the flow of gas is established in the primary pipe by introducing a carrier gas at the inlet end of the primary pipe.

6. The method of claim 5, wherein the carrier gas is air or nitrogen.

7. The method of claim 1, wherein the flow of gas is established in the primary pipe by applying a vacuum to the outlet end of the primary pipe.

8. The method of claim 1, wherein at least two leakage sites are detected.

9. The method of claim 1, wherein the primary pipe is a hazardous material transport system.

10. The method of claim 9, wherein the hazardous material is a hydrocarbon fuel, hazardous waste material, coolant, and/or radioactive liquid waste.

11. The method of claim 1, wherein the primary pipe is in an active drainage system (ADS) or similar system.

12. The method of claim 1, wherein the tracer gas is helium, and the helium is detected with a helium sniffer probe.

13. The method of claim 1 for use in determining a location of at least one leakage site in the primary pipe, the method further comprising:
    changing a flow rate of the gas in the primary pipe once an amount of the tracer gas detected at the outlet end of the primary pipe reaches a steady state;
    detecting a change in the amount of the tracer gas at the outlet end of the primary pipe;
    measuring an amount of time taken to detect the change in the amount of tracer gas from when the flow rate was changed, and using the amount of time taken to detect the change in the amount of tracer gas to determine the location of the at least one leakage site in the primary pipe.

14. The method of claim 13, wherein the method further comprises:
    detecting an additional change in the amount of the tracer gas at the outlet end of the primary pipe; and
    measuring an amount of time taken to detect the additional change in the amount of tracer gas from when the flow rate was changed, and using the amount of time taken to detect the additional change in the amount of tracer gas to determine the location of an additional leakage site in the primary pipe.

* * * * *